(12) United States Patent
Medhekar

(10) Patent No.: US 10,537,885 B2
(45) Date of Patent: Jan. 21, 2020

(54) NICKEL METAL PARTICLE PRODUCTION

(71) Applicant: INVISTA NORTH AMERICA S.A R.L., Wilmington, DE (US)

(72) Inventor: Vinay Medhekar, Beaumont, TX (US)

(73) Assignee: INVISTA North America S.a.r.l., Wilmington, DE (US)

( * ) Notice: Subject to any disclaimer, the term of this patent is extended or adjusted under 35 U.S.C. 154(b) by 123 days.

(21) Appl. No.: 15/321,369

(22) PCT Filed: Jul. 1, 2015

(86) PCT No.: PCT/US2015/038855
§ 371 (c)(1),
(2) Date: Dec. 22, 2016

(87) PCT Pub. No.: WO2016/004219
PCT Pub. Date: Jan. 7, 2016

(65) Prior Publication Data
US 2017/0203287 A1 Jul. 20, 2017

Related U.S. Application Data

(60) Provisional application No. 62/020,251, filed on Jul. 2, 2014.

(51) Int. Cl.
*B22F 9/22* (2006.01)
*B01J 31/18* (2006.01)
(Continued)

(52) U.S. Cl.
CPC .......... *B01J 31/185* (2013.01); *B01J 23/755* (2013.01); *B01J 31/1845* (2013.01); *B01J 35/023* (2013.01); *B01J 35/026* (2013.01); *B01J 35/1009* (2013.01); *B01J 37/04* (2013.01); *B01J 37/14* (2013.01); *B01J 37/16* (2013.01);
(Continued)

(58) Field of Classification Search
None
See application file for complete search history.

(56) References Cited

U.S. PATENT DOCUMENTS 2,000,171 A 5/1935 Gronningsaeter
2,677,607 A 5/1954 Graham et al.
(Continued)

FOREIGN PATENT DOCUMENTS

CA 1056579 A 6/1979
WO 2006/053418 A1 5/2006
(Continued)

OTHER PUBLICATIONS

International Search Report and Written Opinion Received for PCT Application No. PCT/US2015/038855, dated Sep. 22, 2015, 9 pages.
(Continued)

*Primary Examiner* — George Wyszomierski
(74) *Attorney, Agent, or Firm* — INVISTA North America S.a.r.l.

(57) ABSTRACT

Methods are described herein that involve rotating or gently mixing nickel(II)-containing particles in a reaction vessel while heating the particles and flowing a reducing atmosphere through the reaction vessel for a time sufficient to generate free-flowing nickel metal (Ni(0)) from the nickel (II)-containing particles.

8 Claims, 1 Drawing Sheet

(51) Int. Cl.
  *B01J 23/755* (2006.01)
  *B01J 35/02* (2006.01)
  *B01J 35/10* (2006.01)
  *B01J 37/04* (2006.01)
  *B01J 37/14* (2006.01)
  *B01J 37/16* (2006.01)
  *B01J 37/18* (2006.01)
  *B01J 31/26* (2006.01)

(52) U.S. Cl.
  CPC .............. *B01J 37/18* (2013.01); *B22F 9/22* (2013.01); *B01J 31/26* (2013.01); *B01J 2231/322* (2013.01); *B01J 2531/847* (2013.01); *B22F 2999/00* (2013.01)

(56) References Cited

U.S. PATENT DOCUMENTS

| | | | |
|---|---|---|---|
| 3,656,934 A | 4/1972 | Curlook et al. | |
| 3,793,005 A | 2/1974 | Kelly et al. | |
| 3,914,124 A | 10/1975 | O'Neill et al. | |
| 3,962,140 A * | 6/1976 | Alcorn | B01J 23/885 |
| | | | 502/315 |
| 5,981,722 A | 11/1999 | Chen et al. | |
| 6,254,766 B1 * | 7/2001 | Sughrue | B01J 20/06 |
| | | | 208/208 R |
| 7,470,805 B2 | 12/2008 | Rosier et al. | |
| 7,629,484 B2 | 12/2009 | Ritter | |
| 2006/0198782 A1 * | 9/2006 | Cai | B01J 23/755 |
| | | | 423/653 |
| 2013/0143730 A1 * | 6/2013 | Fraga-Dubreuil | B01J 31/1845 |
| | | | 502/167 |
| 2013/0144079 A1 | 6/2013 | Medhekar et al. | |
| 2017/0333879 A1 * | 11/2017 | Fraga-Dubreuil | B01J 23/755 |

FOREIGN PATENT DOCUMENTS

| | | |
|---|---|---|
| WO | 2011/075494 A1 | 6/2011 |
| WO | 2011/075496 A1 | 6/2011 |
| WO | 2012/170537 A2 | 12/2012 |
| WO | 2016/004219 A1 | 1/2016 |

OTHER PUBLICATIONS

International Preliminary Report on Patentability Received for PCT Patent Application No. PCT/US2015/038855, dated Jan. 12, 2017, 8 pages.

Compo, et al., "Minimum Sintering Temperatures and Defluidization Characteristics of Fluidizable Particles", Powder Technology, vol. 51, Issue 1, 1987, pp. 85-101.

Panigrahi, et al., "Dilatometry of Ball Milled Nickel Nano Powder During Non-Isothermal Sintering", Science of Sintering, vol. 39, Issue 1, 2007, pp. 25-29.

Rhamdhani et al., "Advances in research on nickel production through the Caron process", European Metallurgical Conference, 2009, pp. 899-913.

* cited by examiner

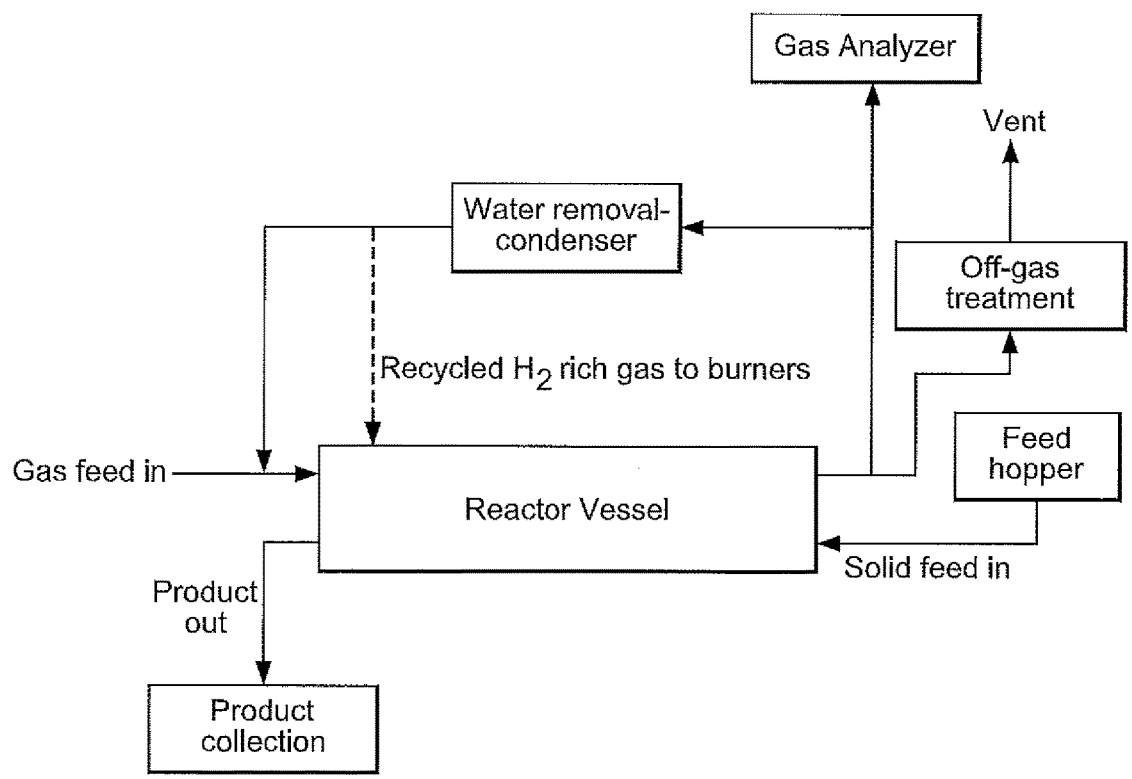

NICKEL METAL PARTICLE PRODUCTION

BACKGROUND

Although catalysts that include nickel metal Ni(0) and nickel-binding ligands have been employed for a number of years, procedures for making those catalysts are not optimally efficient. Nickel metal atoms can be combined with phosphorus-containing ligands to generate hydrocyanation catalysts (see, e.g., U.S. Pat. Nos. 5,981,722, 7,629,484 and 7,470,805) but not always with optimal results. Nickel is poorly soluble, and many nickel metal preparations are unsuitable for use in catalysts because nickel metal is not bound to their ligands. For example, when nickel metal is agglomerated, poorly reduced, or impurities are present, low levels of nickel combine with phosphorus-containing ligands and only small amounts of catalyst are formed. Moreover, nickel starting materials from different commercial sources can have different properties, and even when processed identically one source can provide nickel metal that can combine well with phosphorus-containing ligands, while another source does not.

The processing of nickel source material towards producing active nickel is a difficult process because fine particle sizes of the reduced nickel are desired, but such fine particles are often cohesive. Also sintering of nickel particles occurs at temperatures as low as 200° C. (P. Compo et. al., Powder Technology, 51: 85-101 (1987); B. B. Panigrahi et. al., Science of Sintering, 39: 25-29 (2007)). Reduction of nickel is described in several references, such as U.S. Pat. Nos. 3,793,005, 3,656,934, 2,000,171 and Rhamdhani et. al., Proc. Eur. Metal. Conf. pp. 899-913 (2009). However, such processes do not provide optimal nickel metal particles for making nickel catalysts due to impurities, particle agglomeration, high temperatures employed during reduction, and other factors.

Production of active nickel in a fluidized bed reactor requires additional steps and careful monitoring to minimize this sintering and agglomeration phenomena due to cohesive forces of attraction between particles. This has previously been accomplished by adding some amount of steam to the process (see, earlier filed U.S. Patent No. 20130144079) and by adjusting other variables. There are several limitations to the fluidized bed/steam processing technique that undermine its utility, such as the low amounts of hydrogen that can be utilized when steam is present, and the quality of nickel produced due to presence of steam.

More efficient processes for making such catalysts are desirable, so that greater percentages of nickel preparations can be used in nickel-ligand catalysts and so that less waste is generated during catalyst preparation.

SUMMARY

The present disclosure describes methods of reducing nickel(II) to form nickel(0) metal that avoid particle agglomeration and that improve the activity of the particulate nickel(0) metal product.

One aspect of the invention is a method that involves reducing nickel(II)-containing particles within a reaction vessel having an atmosphere that includes a reductant while rotating or mixing the nickel(II)-containing particles for a time and at a temperature sufficient to generate free-flowing particulate nickel metal (Ni(0)) product from the nickel(II)-containing particles.

The methods involve reduction of nickel(II) particles without high impact collision and without significant compression of the nickel particles. As described herein, the heat used during the reduction process can soften the nickel particles and make them more susceptible to agglomeration when they collide at high velocities or when they are severely compressed together. The processes described herein do not include fluidization of the particles that can lead to such high impact collisions of the particles. Nor do the processes described herein involve compressing the nickel particles through a reduction vessel such as a screw auger. Instead, sintering (agglomeration) is avoided by allowing the nickel particles to gently fall for short distances through a gaseous reductant or by gently turning the nickel particle bed so that the particles are not compressed and do not collide together at high velocity.

The nickel metal product produced by the methods described herein is highly reactive, free-flowing, and readily forms a complex with phosphorus-containing ligands. The process does not require any additional water or steam during reduction, which required in fluidized bed reactors during nickel reduction to prevent agglomeration. Reduction of nickel(II) without added steam produces a nickel metal product that is more reactive than does reduction in presence of steam. Reductant gas with as high as 100% (vol/vol) hydrogen can be employed in the reduction vessel when the methods described herein are employed, but this is not possible in fluidized systems. Only about 10-20% (vol/vol) hydrogen concentration in the reduction gas can be employed when reducing nickel in a fluidized bed processor because the nickel particles will agglomerate if higher concentrations are used. Gas-induced fluidization of nickel particles in a fluidized bed would tend to expose a higher percentage of the particles to the reductant gas and would appear to evenly heat all particles, but such combination of fluidization intensity and heat exposure is not desirable because it leads to particle agglomeration.

Hence, reduction by the methods described herein solves the problems of particle agglomeration and surprisingly produce a better product even though these methods require less time and consume fewer resources than other methods (such as those that employ a fluidized bed).

DESCRIPTION OF THE FIGURE

The FIGURE is a schematic diagram of one type of system useful for reduction of nickel(II) particles to a free-flowing particulate nickel (Ni(0)) metal powder.

DETAILED DESCRIPTION

The invention relates to methods of reducing nickel(II) to form nickel metal (Ni(0)) in a rotary processor. The process quickly and efficiently produces free-flowing nickel metal powder without addition of water or steam. The methods generally utilize higher concentrations of reductant, operate more quickly, and produce nickel metal with improved reactivity than currently available methods that rely upon fluidized bed reactors and the use of steam.

The nickel metal powder generated by the methods described herein exhibits high reactivity, such as for complex formation with phosphorus-containing ligands, and the nickel metal preparations are free-flowing, which not only makes handling easier but improves the solubility and reactivity of the material.

These nickel metal preparations can then be reacted with monodentate or bidentate phosphorus containing ligands, or both, in a nitrile solvent to produce nickel complexes that can be used as homogeneous, organic-soluble catalysts for the hydrocyanation of conjugated dienes to mononitriles, and for the hydrocyanation of unsaturated nitriles to provide dinitriles, e.g., adiponitrile.

Nickel(II)-Containing Particles

Suitable nickel(II)-containing particles from which the nickel metal powder can be prepared include, for example, those selected from any of basic nickel carbonate, nickel oxide, nickel carbonate, nickel bicarbonate, nickel oxalate, nickel formate, nickel squarate, nickel hydroxide, nickel oxide and combinations thereof. Other nickel(II) particles include nickel nitrate, nickel cyanate and nickel sulfate. Many nickel(II)-containing particles are potentially useful.

These nickel(II)-containing particles can be reduced directly into particulate nickel metal (Ni(0)) with a reductant (e.g., hydrogen) at moderate temperatures. Such a direct process is referred to as a one-step process. Alternatively, these nickel(II)-containing particles can first be subjected to calcination, which removes volatile components such as carbon dioxide and water. The nickel in calcined nickel(II)-containing particles is then reduced within an atmosphere containing the reductant (e.g., hydrogen) at moderate temperatures.

The nickel(II)-containing particles that are first subjected to calcination can include basic nickel carbonate, nickel oxide, nickel carbonate, nickel bicarbonate, nickel oxalate, nickel formate, nickel squarate, nickel hydroxide, nickel nitrate, nickel cyanate, nickel sulfate and combinations thereof. Such nickel(II)-containing particles are referred to as "first nickel(II)-containing particles." Calcination of the first nickel(II)-containing particles generates "second nickel (II)-containing particles" that include, for example, nickel (II) oxide, nickel oxalate, nickel formate, nickel squarate, nickel hydroxide, nickel sulfate, or any combination thereof. When calcination is performed before reduction, the process is called a two-step process.

Nickel(II) particles that evolve carbon dioxide in a calcination step are useful as first nickel(II)-containing particles for making nickel metal. The first nickel(II)-containing particles that include substantial amounts of basic nickel carbonate, nickel hydroxide, nickel carbonate, and/or nickel oxide are especially useful. As used herein, basic nickel carbonate includes inorganic compounds such as nickel and carbonate. For example, basic nickel carbonate can be $Ni_4CO_3(OH)_6 \cdot 4H_2O$ or it can include simpler carbonates such as $NiCO_3$ and its hydrate (for example, $NiCO_3 \cdot 4H_2O$, $NiCO_3 \cdot 6H_2O$, and the like. Basic nickel carbonate can be described with the following chemical formula:

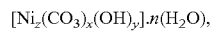

$[Ni_z(CO_3)_x(OH)_y] \cdot n(H_2O)$, wherein $x=z-y/2$; $y=2$ $z-2$ $x$; $z=1$ to 100; and $n=0$ to 400.

Basic nickel carbonate (BNC) can therefore be employed as, or can be included within, the nickel(II)-containing particles processed to generate nickel metal.

Basic nickel carbonate is available commercially. Different sources of nickel(II) particles can have different compositions. For example, basic nickel carbonate can be obtained from MetChem Corporation, an American distributor of this material. According to the vendor, the MetChem basic nickel carbonate is produced by precipitating the basic nickel carbonate from an aqueous solution including nickel, ammonia, ammonium carbonate, and water. The nickel is from an ore including nickel. Hence, the MetChem basic nickel carbonate can include at least one element selected from the group consisting of aluminum, calcium, cobalt, copper, iron, magnesium, manganese, sodium, sulfur, and zinc. One sample of MetChem basic nickel carbonate had a chemical analysis shown in Table 1.

TABLE 1

Analysis of MetChem Basic Nickel Carbonate Powder.
Nickel 47% by weight

| Cobalt 65 ppm | Copper 20 ppm | Iron 55 ppm | Zinc 12 ppm |
|---|---|---|---|
| Magnesium 60 ppm | Calcium 60 ppm | Sodium 60 ppm | Sulfur 175 ppm |

Different sources of nickel(II)-containing particles can have different contaminants as illustrated in Table 1 above. For example, the nickel(II)-containing particles can have less than 10% impurities, or less than 7% impurities, or less than 5% impurities, or less than 4% impurities, or less than 3% impurities, or less than 2% impurities. In general, smaller percentages of impurities are desirable such as less than 1% impurities, or less than 0.7% impurities, or less than 0.6% impurities, or less than 0.5% impurities, or less than 0.4% impurities, or less than 0.3% impurities, or less than 0.2% impurities, or less than 0.1% impurities, or less than 0.07% impurities, or less than 0.05% impurities, or less than 0.03% impurities, or less than 0.01% impurities.

For example, the nickel(II)-containing particles employed in the methods described herein can have less than 100 ppm cobalt, less than 100 ppm copper, less than 100 ppm iron, less than 100 ppm zinc, less than 100 ppm magnesium, less than 100 ppm calcium, and less than 100 ppm sodium. In some instances, the nickel(II)-containing particles employed in the methods described herein have less than 75 ppm cobalt, less than 30 ppm copper, less than 75 ppm iron, less than 30 ppm zinc, less than 75 ppm magnesium, less than 750 ppm calcium, and less than 75 ppm sodium.

Different commercial sources or batches of nickel(II)-containing materials can also include different amounts of water and/or carbon dioxide. Some types of nickel(II)-containing materials release the carbon dioxide more readily during calcination than others. If residual carbon dioxide remains in the nickel(II)-containing particles the reduction step may not generate an optimal nickel(II)-containing particles product or an optimal nickel metal (Ni(0)) product. In general, nickel(II)-containing materials that release significant amounts of carbon dioxide during reduction produce poorly reactive nickel metal. Hence, calcination is carried out at a temperature sufficient to release carbon dioxide, and the calcination proceeds until carbon dioxide is no longer released from the nickel(II) particles. Upon reduction, the nickel metal (Ni(0)) product has improved reactivity.

Basic nickel carbonate is a useful source of nickel(II)-containing particles. However, it may be desirable to manufacture the basic nickel carbonate rather than obtaining it from a commercial source to avoid impurities and inconsistencies in processing. The composition of the basic nickel carbonate can be controlled by manufacture of the basic nickel carbonate using selected reactants and manufacturing conditions.

Suitable basic nickel carbonates can be produced by precipitating the basic nickel(II) carbonate from an aqueous solution including nickel(II), carbonate anion, and water. For example, basic nickel carbonate can be produced by precipitating it from at least one aqueous solution selected from the group consisting of (1) an aqueous solution including nickel(II), ammonia, ammonium carbonate, and water; (2) an aqueous solution including nickel(II), carbonate anions, and water; and (3) an aqueous solution including nickel(II), bicarbonate anions, and water.

Basic nickel carbonate compositions can be made by adding a precipitant solution to a nickel solution in a precipitation reactor to form a reaction mixture; and precipitating a nickel composition from the reaction mixture, wherein the nickel solution includes nickel(II) ions and water. The precipitant solution can be selected from the group consisting of: (a) bicarbonate ions and water, (b) carbonate ions and water, and (c) mixtures thereof. The mole ratio of bicarbonate ions to nickel ions in the reaction mixture after adding the precipitant solution can range from 0.1:1 to 2:1. Blends of bicarbonates and carbonates can also be used in the precipitant solution. Further information on preparing and using basic nickel carbonate is available in PCT/US2010/060388, filed Dec. 15, 2010 and published as WO/2011/075496, and in PCT/US2010/060381, also filed on Dec. 15, 2010 and published as WO/2011/075494, which are both specifically incorporated herein by reference in their entireties. A highly pure basic nickel carbonate with predictable and substantially uniform calcination and reduction properties can therefore be produced.

Calcination and reduction can be carried out in the same reactor. Previously, it was thought that the reactor should provide substantially uniform conditions for calcination and reduction such that the temperature is substantially uniform throughout the reactor, the atmosphere (e.g., reductant) is dispersed throughout the reactor and the nickel(II) particles are uniformly exposed to the atmosphere. However, such uniformity is not necessarily desirable. Gently turning of nickel(II) particles so that the particles on the surface of the particle bed contact fresh reductant while particles within the body of the particle bed are later contacted with reductant can surprisingly provide improved product. Such gentle mixing avoids hot spots of exothermic reduction throughout the particle bed, which minimizes particle sintering. Gentle mixing reactors such as a rotary processor provide such conditions. Calcination and reduction of the nickel(II) particles can be performed in the same gentle-mixing reactor. Based on the objective of producing free flowing nickel particles, reduction in such a gentle-mixing reactor can be more effective than in other reactors such as fluidized bed reactors. Thus, the methods described herein are advantageously performed in a gentle-mixing reactor (e.g., rotary processor).

In some embodiments, the gas phase can flow in a counter-current fashion over or through the nickel solid phase. Such a counter-current flow mode means the two or more reacting phases are traveling in the opposite direction of each other. In other embodiments, the contact between the two phases can occur in a co-current flow mode. The co-current flow mode means the two or more reacting phases are travelling in the same direction of each other. Other flow modes for the contact may include, but not limited to, sparged-flow, cross-flow, up-flow, down-flow, laminar-flow, turbulent-flow, thin film-flow, dispersion-flow, circulatory-flow, and combinations thereof.

For example, the first containing nickel(II) particles can be charged into or placed within a rotary reactor, which rotates the particles to contact the nickel(II) with an atmosphere that flows through the processor. For calcination, the atmosphere that flows through the processor can be a gas containing one or more oxidizing constituent(s), optionally in an inert carrier gas. For example, the calcination atmosphere can include air, oxygen, ozone, or combinations thereof in a carrier such as nitrogen, argon, helium, or combinations thereof. Air is an inexpensive and effective calcination atmosphere. Calcination of the first containing nickel(II) particles generates second containing nickel(II) particles that have volatile components removed. The second containing nickel(II) particles can then be reduced to nickel metal. During reduction the atmosphere contains a reductant such as hydrogen, methane, higher carbon hydrocarbons, ammonia, synthetic gas ($H_2/CO$) or a mixture thereof. These processes are described in more detail below.

In one embodiment, the spent calcination off-gas may be treated by such common industrial practices as cyclone separation, condensation drying, membrane separation, absorption scrubbing (e.g. for $CO_2$), and circulated back into the process with fresh make-up gas added as needed. In another embodiment, the chemically released water during the calcination process may be condensed from the spent off-gas, collected and re-used for non-process applications, while the dry gas containing a majority of oxidizing constituents in an inert carrier (e.g. $O_2$ in $N_2$) may be circulated back into the process.

In some embodiments, the gas feeds of desired quality may be obtained from other processes such as from chemical reactions, petro-chemical refining, combustion, scrubbing, bio-refining, fuel-cell operations, water electrolysis, gas separation, or combinations thereof. In other embodiments, the gas feeds of desired quality may be supplied by industrial gas producers.

Reduction

Reduction of nickel(II) involves addition of electrons to nickel and a decrease in oxidation state of the nickel(II). Reduction is performed under conditions sufficient to reduce at least a portion of nickel(II)-containing particles to particulate nickel metal. Conditions sufficient to reduce at least a portion of the nickel(II)-containing particles include an elevated temperature, an amount of reductant or a reducing agent, and a time sufficient to substantially reduce the nickel(II)-containing particles to form a particulate nickel metal (Ni(0)) powder. The nickel metal (Ni(0)) product is a particulate solid material that includes nickel metal (Ni(0)) in the form of a free-flowing powder.

A reductant can be used for such reduction. The reductant can be any gaseous or particulate substance that can reduce nickel(II) to nickel metal (Ni(0)). Examples of reductants include, for example, hydrogen, ammonia, carbon or carbon containing compounds (such as coal or coke, methane, higher carbon hydrocarbons), and combinations thereof. The atmosphere can contain a reductant in an amount sufficient to reduce at least a portion of the nickel in the nickel(II)-containing particles to particulate nickel metal (Ni(0)). In some embodiments, the reductant does not include carbon-containing substances.

Hydrogen is a convenient and inexpensive reductant that is generally highly effective as a reductant. Moreover, when hydrogen is used as the reductant, the off-gas from the reduction process can contain significant amounts of hydrogen (e.g., 20% to 70% by volume) that can be recycled either back into the reduction process or to gas burners for heating the calcination and/or reduction vessel.

A carrier gas can be mixed with the reductant. For example, the carrier gas can be an oxygen-free gas such as a noble gas or nitrogen. Noble gases that can be employed include helium, neon, argon, krypton, or xenon. Deoxygenated air is another example of a substantially oxygen-free gas. Nitrogen is a convenient and fairly inexpensive carrier gas.

The percentage of reductant in the atmosphere of the reactor can be about 0.1% to 100% by volume, or about 5% to 85% by volume, or about 50% to 85% by volume, or about 55% to 80% by volume, or about 60% to 75% by volume, or about 65% to 75% by volume, or about 70% by volume. One example of an effective atmosphere for a reduction gas includes about 70% hydrogen, and about 30% nitrogen, by percent volume.

Some previously available calcination and/or reduction methods have added steam to the reductant used in a batch or a fluidized bed system to prevent agglomeration of nickel particles during such processes. However, the concentration of hydrogen reductant that can be used in a fluidized bed system must be less than about 20% (vol/vol) hydrogen, or agglomeration will occur even when steam is added.

However, no such addition of steam or water is needed for reduction by the methods described herein. Nor is addition of water or steam to the gaseous atmosphere for reduction desirable when the methods described herein are employed. When the nickel(II) particles to be reduced include nickel oxide, a hydrogen reduction process produces some steam (or water vapor) because the hydrogen chemically combines with the oxygen contained in the nickel oxide to generate water vapor as reduction proceeds. However, such an amount of steam generated during the nickel reduction process in a fluidized bed environment is not sufficient to prevent agglomeration. Instead, nickel(II) reduction in the fluidized bed environment must be supplemented with at least 10% or 20% steam, externally added to the reduction gas, to prevent particle agglomeration. In contrast, nickel oxide is readily reduced by gentle mixing (e.g., in a rotary bed) to produce a free flowing product without any addition of water or steam to the reductant.

Added steam is not needed, and is not desirable, when the nickel(II) particles are reduced by gentle mixing (e.g., in a rotary processor). From extensive lab and gas fluidized solid bed testing, the inventors have identified that sintering of nickel particles is exacerbated by the higher collision rate among particles in a fluidized bed system when the particles are exposed to reduction conditions. Nickel particles can begin to soften at temperatures as low as 200° C. (P. Compo et. al., Powder Technology, 51: 85-101 (1987); B. B. Panigrahi et. al., Science of Sintering, 39: 25-29 (2007)). The inherent turbulence present in a fluidized bed system leads to more frequent and greater impact forces between particles. Such higher impact and more frequent particle collisions results in a greater exchange of energy between particles, which in turn results in greater propensity for particles to agglomerate. Such agglomeration can occur at temperatures as low as 300° C. The propensity for agglomeration is further increased by the exothermic reduction process. As the previous application U.S. Patent No. 20130144079 describes, addition of steam helps to minimize the agglomeration in a fluidized bed process. The presence of steam may also shift the equilibrium away from reduction because water is a product of the reduction process and when more water is present the reduction reaction equilibrium can shift away from reduction. Hence, although reduction fluidized bed provides the uniform thermal environment for the reduction, a greater propensity for agglomeration must be counter-balanced by the addition of steam to the process.

Although the use of steam at vol/vol percentages of 10% or more can reduce such agglomeration, the activity of nickel particles reduced in the presence of steam can be two to seven times lower than when the nickel particles are reduced without steam (where the activity of nickel particles is measured as the rate at which nickel dissolves in an organic ligand solution). As the examples below show, this is somewhat due to sintering of nickel surfaces thereby reducing their specific surface area measured as BET surface area ($m_2/g$).

Fluidized bed reactors can lead to agglomeration of nickel particles, for example, because the particles undergo repeated high impact collisions while being heated to a point where some softening of the particles can occur. Such a process leads to sintering (agglomeration) of at least some of the particles. Processors other than fluidized bed reactors can lead to the same problems with agglomeration. For example, systems where the nickel particles are significantly compressed against one another such as a screw auger system, which can apply significant compressive force as the particles are moved through the system, can lead to agglomeration of the particles.

When the collision impact velocity and compressive forces are minimized between particles a free flowing reduced nickel product can be produced. There are several types of processors that can be employed to avoid nickel particle agglomeration. Examples include rotary type reactors, multiple hearth furnace reactors, and tubular packed reactors operated at close to atmospheric pressure (minimizing compressive forces). Systems that employ spray-dryer type equipment where the particles are highly dispersed in the gas phase to minimize particle-to-particle interaction can also be employed.

There are advantages to use of a rotary reactor for reduction. Up to 100% hydrogen can be employed in the rotary processor, which is not possible in reactors where steam must be added (e.g., in fluidized bed reactors). The processing steps are simple and easier to control in the rotary processor than in other reactors. The consumables required for carrying out the processing in a rotary processor are also significantly lower than, for example, in a fluidized bed reactor. Most of the consumables used in the fluidized bed reactor process are utilized in keeping the bed fluidized. The processing of different raw materials in a fluidized bed system requires evaluating their individual fluidization characteristics which is costly, time consuming and not necessarily readily scalable. Whereas in a rotary unit, there are no such issues in processing different supplier's raw material and as such is a much robust technology. Reduction in a rotary reactor is fast, energy efficient, and generates an improved product.

In the Examples described herein, fine nickel(II) containing particles (e.g., nickel oxide particles) are gently rolled inside a rotary kiln reactor with a co-current or counter-current flow of reducing gases. The reduction occurs at the exposed surface of the particle bed. The exposed surface of the particle bed is continually refreshed as the kiln rotates. The gases have to diffuse through the layers of solid particles, so the rate of reaction is limited by the rate of hydrogen diffusion. Thus, particles are not compressed or subjected to high impact forces, and fewer hot spots are present during the exothermic reduction process. The incidence of agglomeration is minimized.

Applicants have discovered that additional steam is therefore not needed when the nickel particles are not subject to high impact collisions or compression during reduction. Processors such as rotary processors prevent agglomeration and clumping of the reduced nickel product without the use of water vapor or steam, thereby facilitating removal of the product from the reaction vessel. When no steam is added to the rotary processor the reactivity of the nickel metal product is improved, for example, because the presence of steam reduces the particulate surface area of the nickel metal (Ni(0)) particles. Use of such equipment can improve the reactivity of the nickel product by two- to seven-fold.

A calcination step can be performed before reduction to remove residual water in the nickel(II) particles before reduction. Calcination procedures are described hereinbelow. Also prior to reduction, the reactor containing the nickel(II)-containing particles (e.g., the first nickel(II)-containing particles and/or the second nickel(II)-containing particles) can be flushed with the substantially oxygen-free gas to remove molecular oxygen and other undesired gases (e.g., carbon dioxide and any residual water vapor) from the apparatus and from the nickel(II)-containing particles. The reductant or reducing agent (e.g., hydrogen gas) can then be introduced into the atmosphere of the reactor so that a mixture of reducing agent and the substantially oxygen-free carrier flows through the reactor.

Gas flow rate during the process relates to the size and/or type of reactor equipment used for the reduction and is within the knowledge of the skilled person to select an appropriate rate. For example, in smaller reactors, the gas flow rate during reduction can be about 0.1-10 L/minute, or about 1-8 L/minute, or about 2-7 L/minute, or about 3-6 L/minute. In larger reactors a gas flow rate of about 5-80 L/minute, or about 10-70 L/minute, or about 15-60 L/minute, or about 20-50 L/minute, or about 25-40 L/minute, or about 25-35 L/minute. The gas flow rate can be adjusted as desired or it can be determined by the type of equipment used for the reduction.

Reactor pressure during the reduction step is not critical. Thus, reduction can be performed at a pressure of about 0.1 atmospheres to 20 atmospheres, or at about 0.5 atmospheres to 10 atmospheres, or at about 0.5 atmospheres to 2 atmospheres. The reduction can conveniently be performed at about one atmosphere pressure.

The reduction step is advantageously performed at a temperature between 150° C. and 800° C., for example, between 175° C. and 600° C., between 200° C. and 500° C., between 225° C. and 425° C., between 250° C. and 375° C., between 260° C. and 370° C., or between 270° C. and 365° C., or between 275° C. and 360° C., or between 280° C. and 355° C., or between 285° C. and 360° C., or between 290° C. and 360° C., or between 300° C. and 350° C. However, the range of temperatures that can be employed includes any numerical range representing a temperature range falling between 250° C. and 375° C. Temperatures at the lower end of these ranges (e.g., 250° C.) can require longer reduction times. Reductions at high temperatures (e.g., 375° C. or higher) can, under some circumstances or conditions, yield agglomerated nickel, and/or nickel powders with low reactivity for producing the nickel-ligand catalyst complex described above.

The reduction time is a function of the solids throughput, starting feed quality, pressure, temperature, gas-solid contacting efficiency and the flow rate and concentration of reducing gas. Reduction can typically be performed for about 0.5 hours to about 2.5 hours, or for about 0.75 hours to about 2.25 hours, or for about 0.9 hours to about 2.1 hours, or for about 1 to about 2 hours, when a stoichiometric excess of reductant is employed. For example, when temperatures between 300° C. and 350° C. are employed the reduction can be carried out 1-2 hours, provided a stoichiometric excess of reducing agent (e.g., hydrogen) is passed through the reactor to convert the nickel(II)-containing particles to nickel metal powder.

When hydrogen is used as the reducing agent, introduction of hydrogen to the reaction vessel can cause a temperature increase in the bed of nickel-containing particles, for example, of from about 10° C. to about 50° C., depending upon the concentration of hydrogen. One of skill in the art can readily adapt the conditions in the rotary reactor vessel to accommodate variations in temperature, reductant concentration and the like.

The reductant can be continuously added to the reduction vessel via an inlet valve and exit via an exit valve. Alternatively, a large excess of the reductant can be sealed with the nickel(II)-containing particles inside the reduction reactor. In general, the reductant is continuously added to the reactor so that fresh reductant is continually available to the nickel particles.

The stoichiometric amount of hydrogen needed to reduce nickel(II) particles such as nickel oxide is theoretically a 1:1 molar ratio. However, the amount of reductant employed for reduction is typically in excess of such a stoichiometric amount, in part because the contact efficiency of the reduction system employed can vary. For example, when hydrogen is used as the reducing agent in a rotary kiln reactor, the larger unoccupied volume of space inside the kiln provides an opportunity for some of the hydrogen to bypass the nickel particle bed. The amount of gas that bypasses the nickel particles is dependent on variety of factors that include the internal volume and shape of the reduction vessel, the rate of revolution or mixing, the solid feed rate, and the material burden volume. Hence, in practice the amount of hydrogen to nickel oxide needed is greater than a 1:1 molar ratio. For example, $H_2$/NiO molar ratios employed can be greater than 2:1. Examples of $H_2$/NiO molar ratios that can employed include ratios between about 1.9 and 2.5, or between about 2.0 to about 2.4. A molar ratio of $H_2$/NiO lower than 1.9, or between 1 and 2 can yield an under-reduced material even though sufficient hydrogen theoretically has been introduced, due to inefficient contact between the gas and particles during the reduction process. A person skilled in the art can readily improve this efficiency by changing the internal dimensions of the kiln, modulating the reductant gas flow rate, or increasing the residence time of the nickel oxide.

After reduction, the flow of hydrogen can be terminated. The rotary reactor can be flushed with substantially oxygen-free gas to remove residual hydrogen. The reduced nickel can be discharged to an oxygen-free vessel such as a tote. The tote can be purged with an oxygen-free gas, and/or have a fitting that allows purging with a selected gas, or evacuation of the gaseous atmosphere within the tote. The nickel metal (Ni(0))-containing product is stored in a vacuum or in a substantially oxygen-free gas. For example, the nickel metal produced by the reduction step can be stored under inert atmosphere, such as nitrogen or argon atmosphere, until use.

The amount of nickel metal generated and its purity can be determined by a metal analysis using methods known to the skilled person. Similarly, the amount of nickel in any of the nickel-containing compositions or particles used in the methods described herein can be determined by a metal analysis using methods known to the skilled person.

The nickel metal (Ni(0)) product generated nickel preparation can have less than 10% impurities, or less than 7% impurities, or less than 5% impurities, or less than 4% impurities, or less than 3% impurities, or less than 2% impurities. In general, smaller percentages of impurities are desirable such as less than 1% impurities, or less than 0.7% impurities, or less than 0.6% impurities, or less than 0.5% impurities, or less than 0.4% impurities, or less than 0.3% impurities, or less than 0.2% impurities, or less than 0.1% impurities, or less than 0.07% impurities, or less than 0.05% impurities, or less than 0.03% impurities, or less than 0.01% impurities, or less than 0.005% impurities.

The reductant from the reduction process can be recycled. For example, the spent reduction off-gas may be treated by commonly available industrial practices such as cyclone separation, condensation drying, membrane separation, and absorption scrubbing. Components of the off-gas can then be circulated back into the process, for example, with addition of fresh reductant and/or carrier gas. During reduction of some nickel(II) containing materials water can be released. Usually, the water content of the reduction off-gas is only on few percent by volume. Such chemically released water process can be condensed out of the spent reduction off-gas. Water and other off-gas components can be collected and re-used for non-process applications, while the dry gas containing majority of reductant and any remaining carrier (e.g. $H_2$ in $N_2$) gas can be circulated back into the process.

In some instances, it is more economical to utilize the off-gas, or components thereof, as fuel to heat the calcination or reduction vessel. For example, an externally fired natural gas heated rotary kiln can be adapted to burn hydrogen from the off-gas in addition to the natural gas. While the hydrogen in the off-gas from a reduction process can also be used for reduction of the nickel(II) particles as described above, the reduction process is generally more effective if highly pure, dry hydrogen is employed (e.g., with some pure dry carrier gas). The investment in recycle loop could be avoided if some of the hydrogen cost going in the off-gas can be recovered by using it as an energy source in the external gas fired burners. If electrical energy is being used for heating the kiln, then purification of off-gas of steam and recycling the rest may be viable option.

The FIGURE is a schematic diagram of an example of a system that can be used to reduce nickel(II) particles to a particulate nickel metal powder in a counter-current flow mode. The system can include a reactor vessel that receives solids (e.g., nickel(II) particles) from a feed hopper at one end of the vessel and gaseous feed (e.g., a reductant) at the other end. The product (e.g., particulate nickel metal powder) exits the reaction vessel at the gas feed end and is collected in a product collection vessel. When the off-gas exits the reaction vessel at the solid feed end. The off-gas can be treated to permit venting. Alternatively, the off-gas can be subjected to fractionation to remove undesired components such as water. Off-gas components (e.g., dry gas purified reductant) can be circulated back into the reduction vessel to be re-used during the reduction process. Alternatively, when the reductant gas feed contains flammable components such hydrogen, the off-gas can be burned to supply heat for the reduction process (or other processes such as calcination).

Calcination

Calcination can be used to remove volatile components from first nickel(II)-containing particles. Reduction is performed after calcination.

Although nickel(II)-containing particles can be reduced to nickel metal (Ni(0)) in one step, it may be useful to calcine the nickel-containing compositions prior to reduction. As used herein "calcine" or "calcining" or "calcination" is a thermal treatment process applied to nickel(II)-containing compositions in order to bring about a thermal decomposition, phase transition, or removal of a volatile fraction. Calcination can be performed using any available calcination procedure or apparatus in presence of appropriate gas environment such as air or nitrogen, or in other suitable media, or even in absence of gas environment such as partial or total vacuum.

In general, such a calcination step is carried out using conditions sufficient to calcine the nickel containing particles. The calcination can be performed under conditions sufficient to substantially remove volatile materials. Such volatile materials include carbon dioxide, nitrate, nitric acid, formate, formic acid, cyanate, hydrogen cyanide, sulfate, sulfuric acid, water and the like. For example, carbon dioxide or carbon dioxide and water can be the major volatile materials that are removed, particularly when the nickel(II)-containing composition is basic nickel carbonate.

The calcination can be performed under conditions sufficient to convert first nickel(II)-containing particles substantially into nickel(II) oxide (NiO).

Calcination can be carried out in any suitable reactor, such as a fluid bed reactor, a fixed bed reactor, an expanded fixed bed, a rotary kiln, a rotary pan, and such equipment known to the skilled person. Calcination of nickel(II)-containing particles can conveniently be performed in a rotary processor, which can yield a nickel metal (Ni(0)) preparation that is highly reactive and free-flowing. Moreover, the nickel (II)-containing particles can be reduced in the same rotary processor as was used for calcination pursuant to the methods described herein.

The conditions within the rotary processor are adapted to calcine the nickel-containing particles. Generally, calcination can be carried out in any gas or atmosphere that does not react with nickel-containing salts or compound to form undesirable nickel-containing materials. The gas or atmosphere can contain oxygen. Suitable convenient gases for the calcination step include air and nitrogen; others can include argon and helium. Air is therefore conveniently used during many calcination procedures. Thus, conditions sufficient to calcine nickel-containing materials include contacting the first nickel(II)-containing particles with an atmosphere that contains oxygen (e.g., air).

Temperatures useful for calcination of first nickel(II)-containing particles include those in the range of about 250° C. to 600° C. Below 250° C. the calcination can be incomplete, so that the first nickel(II)-containing particles are not completely converted to second nickel(II)-containing particles. Instead, the partially calcined materials can contain volatile materials that can reduce the activity of the final nickel product. Above 600° C., excessive collapse or sintering of the first nickel(II)-containing particles may occur under some conditions, consequentially reducing the reactivity of the nickel powder product.

The time for optimal calcination varies inversely with the temperature: when lower temperatures are used (e.g., 250° C.) calcination can be performed for longer time periods (e.g., up to 18-20 hours). However, when calcination is performed at temperatures of about 300° C. to 600° C., a shorter time period is effective for calcination, for example, about 10 minutes to about 6 hours, or about 10 minutes to 4 hours. The time for the calcination step can range from tens of seconds at 600° C. to multiple hours at 250° C. In general, calcination of the first nickel(II)-containing composition is complete within about 30 minutes to 2 hours when using temperatures of about 350° C. to 500° C. Especially desirable calcinations temperatures are from about 400° C. to about 500° C. At temperatures between 450° C. and 500° C., calcination is substantially complete within about 1-2 hours.

Effective calcination can be monitored and detected by observing the release of volatile components such as carbon dioxide from the nickel(II)-containing composition and/or by observing the conversion of nickel(II)-containing salts and compounds within the composition to nickel oxide (and/or nickel hydroxide). Calcination can therefore continue until volatile materials (e.g. carbon dioxide and/or water) are no longer detected in the effluent gases emerging from the calcination chamber. In some cases, calcination can be continued for 5-60 minutes after volatile materials is no longer detected in the effluent gases emerging from the calcination chamber. For example, calcination can continue for 5-30 minutes, or for 5-20 minutes, or for 5-15 minutes after volatile materials are no longer detected in the effluent gases emerging from the calcination chamber.

After calcination is completed, the flow of oxygen-containing gas is terminated and the apparatus can be flushed with a non-oxygen-containing or inert gas. Nitrogen is useful for this purpose but other non-oxygen-containing or inert gases can also be used (e.g., noble gases such as argon or neon). The flow of the non-oxygen containing or inert gas is continued until oxygen is substantially removed from the reactor bed of the apparatus. The reduction of nickel in the calcination product can then be performed.

A rotary reactor can be employed to perform the steps of calcination and reduction of the nickel(II)-containing particles to nickel metal (Ni(0)) powder. Any available rotary reactor can be employed.

Ligand Complex Formation

The nickel metal (Ni(0)) preparations generated as described herein can be combined with a phosphorus-containing ligand to generate a catalyst. When contacted with suitable phosphorus containing ligands the preparations of nickel metal powders described herein provide organophosphorus-based nickel catalysts for catalysis of hydrocyanation reactions.

The nickel metal powder generated as described herein can be used to produce an organophosphorus nickel catalyst useful in hydrocyanation chemistry, such as in the homogeneous catalytic reaction of hydrogen cyanide with 1,3-butadiene. For example, processes to provide the organophosphorus nickel catalyst can involve contacting the nickel metal powder (e.g., generated as described herein) with a phosphorus containing ligand in an organonitrile solvent, optionally in the presence of a Lewis acid. The phosphorus containing ligand can be monodentate, e.g. tri-tolylphosphite, or a bidentate ligand. The monodentate ligand can require a catalyst, such as di-tolyl-chloro-phosphite, to catalyze the formation of the organophosphite nickel complex. The bidentate ligand can require the addition of a Lewis acid (e.g. zinc chloride) for efficient formation of the organophosphite nickel complex. Thus, for example, the nickel powder can be contacted with the ligand, such as a ligand dissolved in an organonitrile solvent or other organic solvent, with a Lewis acid such as zinc chloride. The solution can be mixed in an agitated slurry reactor at a temperature of about 5° C. to about 60° C. to 120° C. The nickel complex so-produced is an effective hydrocyanation catalyst.

The phosphorus-containing ligand can be selected from the group consisting of a bidentate phosphite, a bidentate phosphonite, a bidentate phosphinite, a bidentate phosphine, and a mixed bidentate ligand; wherein the mixed bidentate ligand is selected from the group consisting of a phosphite-phosphonite, a phosphite-phosphinite, a phosphite-phosphine, a phosphonite-phosphinite, a phosphonite-phosphine, and a phosphinite-phosphine.

The phosphorus-containing ligands are chemically bonded to nickel as complexes, where the nickel includes zero-valent nickel. Some levels of free phosphorus-containing ligands, not bonded to said complexes, can be present such as monodentate or multidentate ligands, for example bidentate or tridentate ligands. The term "bidentate" means that the ligand contains two phosphorus atoms per ligand molecule, and, both phosphorus atoms of the ligand are bonded to a single metal atom. The term "tridentate" means the ligand contains three phosphorus atoms per ligand molecule, and the three phosphorus atoms of the ligand are bonded to a single metal (e.g., nickel) atom. The phosphorus-containing ligand can be a single compound or a mixture of compounds. The phosphorus-containing ligand can be selected from the group consisting of a phosphite, a phosphonite, a phosphinite, a phosphine, and a mixed P-containing ligand or a combination of such members.

An example of a bidentate phosphorus-containing ligand that can be employed is represented by Formula I.

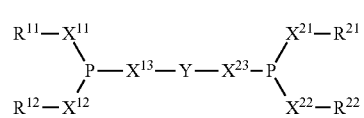

Formula I wherein, $X^{11}$, $X^{12}$, $X^{13}$, $X^{21}$, $X^{22}$, and $X^{23}$ independently represent oxygen or a single bond;

$R^{11}$ and $R^{12}$ independently represent identical or different, single or bridged organic radicals;

$R^{21}$ and $R^{22}$ independently represent identical or different, single or bridged organic radicals; and Y represents a bridging group.

It is to be understood that Formula I can represent a single compound or a mixture of different compounds, each having the indicated formula.

Monodentate phosphorus-containing ligands can be selected from the group consisting of a monodentate phosphite, a monodentate phosphonite, a monodentate phosphinite, and a monodentate phosphine.

The Lewis acid can be selected from the group consisting of inorganic compounds, organic compounds, and organometallic compounds. For example, the Lewis acid can include at least one chemical element selected from the group including scandium, titanium, vanadium, chromium, manganese, iron, cobalt, copper, zinc, boron, aluminum, yttrium, zirconium, niobium, molybdenum, cadmium, rhenium, lanthanum, europium, ytterbium, tantalum, samarium, and tin. A Lewis acid can, for example, be selected from the group consisting of zinc chloride, ferrous chloride, or a combination of zinc chloride, ferrous chloride and mixtures thereof. For example, the Lewis acid can be zinc chloride.

Assay for Nickel-Phosphorus Ligand Complex Formation

To evaluate the suitability of nickel preparations for preparation of hydrocyanation catalysts, a nickel preparation is evaluated to ascertain whether nickel metal forms a complex with one or more phosphorus-containing ligands at a rate sufficient for use in a manufacturing process.

An assay can be used to evaluate the suitability of nickel preparations for preparation of hydrocyanation catalysts. Such an assay involves mixing a nickel test sample (e.g., 1-7 wt % nickel relative to the total weight of the reaction mixture) with one or more phosphorus-containing ligands and a Lewis acid in an organonitrile solvent. The phosphorus-containing ligand can be any of the phosphorus-containing ligands described herein. Preferably, the phosphorus-containing ligand can be a bidentate phosphite ligand such as Ligand (V). The Lewis acid can be zinc chloride. The organonitrile solvent can be pentenenitrile.

A sample of known mass of the nickel powder (e.g., 4 wt % nickel) can be contacted with about 0.5 to 2.5 moles Lewis acid (such as zinc chloride) per mole bidentate phosphite ligand (e.g., Ligand (V)) in a 3-pentenenitrile (3PN) solution. The mixture can be warmed for a period of hours, during which time the level of solubilized nickel in solution is measured by liquid chromatography (LC). The amount of ligand and/or zinc chloride in the assay mixture can be in stoichiometric excess relative to the amount of nickel powder added. However, it may be desirable to limit the amount of ligand and/or zinc chloride in the assay mixture relative to the amount of nickel powder added. Thus, the concentration of ligand and/or zinc chloride in the assay mixture can be limiting relative to the amount of nickel powder present.

Nickel becomes soluble in the organonitrile solvent (e.g., a hydrocyanation substrate such as 3-pentenenitrile) when it forms a complex with the phosphorus-containing ligand. Unreacted nickel metal can be removed from the mixture by filtration or centrifugation.

To avoid contact with air, a reactor bottle, equipped with a magnetic stir bar, can be charged with the reactants inside a dry box operating with a dry nitrogen atmosphere. The reactants added to this bottle can include the nickel preparation to be tested, one or more phosphorus-containing ligands (e.g. Ligand (V)), where the solvent is 3-pentenenitrile. Zinc chloride can also be added to the assay mixture.

To standardize the test procedure, 4-5 wt % nickel is mixed at about 60° C. to 80° C. in a 3-pentenenitrile (3PN) solution containing about 0.5 to 2.5 moles zinc chloride per mole bidentate phosphorus-containing ligand. For example, 4 wt % nickel preparation can be mixed with approximately 5.25 wt % Ligand (V) and 6300 ppm $ZnCl_2$ in a solution of 3-pentenenitrile. The zinc to Ligand (V) molar ratio employed is then about 0.75.

The reactor bottle can be sealed, removed from the dry box, and moved to a laboratory fume hood where it can be placed on a magnetic stir plate. The reaction mixture within the reaction bottle can then be heated to 60° C.-80° C. (e.g., 60° C.). Sufficient agitation can be used to suspend the nickel-containing solid in this reaction mixture.

Filtered liquid samples from the reaction mixture can be removed from the reactor bottle at intervals of from 5 minutes to one hour. A final sample can be taken after a known equilibrium value of Ni(0) is achieved. This equilibrium quantity of Ni(0) typically takes about 6-24 hours based on the operating conditions. The amount of soluble nickel in the samples is measured using liquid chromatography (LC). This limit of detection for this assay is about 20-50 ppm soluble nickel in the form of soluble nickel complexes of Ligand (V).

The activity of a nickel preparation is therefore measured by its propensity to form soluble zero-valent nickel metal phosphorus ligand complexes. The activity of a nickel preparation can be compared to a control nickel preparation in this assay for formation of soluble zero-valent nickel metal phosphorus ligand complexes. For example, the control nickel preparation can be a nickel preparation that is determined to have inadequate activity. An active nickel preparation is therefore a nickel form that has more activity than the inactive negative control nickel preparation. The control nickel preparation can be a nickel preparation that is determined to have good activity. An active nickel preparation is therefore a nickel form that has about the same or more activity than the active positive control nickel preparation.

One example of a control nickel preparation is a nickel powder obtained from MetChem BNC using a one-step hydrogenation process (i.e., not including calcination pretreatment), where the hydrogenation is performed at 400° C. Such a nickel preparation made from MetChem BNC is described in Table 1 and has nickel activity that is typically below that which enables the efficient preparation of the zero-valent nickel complexes suitable for use in a manufacturing process involving a hydrocyanation catalyst.

An empirical rate equation for Ni dissolution in catalyst-preparation assay is employed to provide a numerical value indicative of nickel 'activity' (ability to become a soluble catalyst complex with Ligand (V)) in the following reaction:

$$Ni + Ligand\ (V)(A) + ZnCl_2(B) + 3PN \leftrightarrow Catalyst\ (C)$$

The following equation describes the rate of Nickel-Ligand (V) catalyst formation:

$$r = a * k'* w_{Ni} * C_A^{a'} * C_B^{b} * [1 - C_c/(K_{eq} * C_A * C_B)] * 2 * (C_A/C_{A0})/[1 + (C_A/C_{A0})]$$

where:
a=activity of nickel
$w_{Ni}$=weight loading of nickel (weight of nickel/weight of solution)
k'=Arrhenius rate constant:

$$[(mmoles\ Ni/liter)^{0.5}/hr] = 1.539 \times 10^{10}\ exp[-6832.1/T(K)]$$

$C_A$=concentration of Ligand (V) (mmol/L)
$C_{A0}$=Initial concentration of Ligand (V) (mmol/L)
$C_B$=concentration of $ZnCl_2$ (mmol/L)
a'=order of reaction with respect to D80=0
b=order of reaction with respect to $ZnCl_2$=0.5
$K_{eq}$=equilibrium constant for the chemical reaction $$[liters/mmol] = exp[11555/T(K) - 35.231]$$

T=temperature in degree Kelvin.

It is assumed that the 3-pentenenitrile is in far excess. The order of reaction with nickel loading is considered to be 1.

The rate constant k' is defined for a standard MetChem BNC reduced at 400° C. under pure hydrogen to nickel. However, to account for other sources of nickel that can have different properties, a factor is applied that is termed the activity of nickel dissolution. The 'activity' number was chosen to be 1 for the specific condition of MetChem BNC reduced at 400° C. to nickel, dissolved at 80° C. in the catalyst-preparation solution with $ZnCl_2$/Ligand (V) molar ratio of 0.8 and 4 wt % nickel loading where dissolution is at a rate of 980 ppm Ni/hr. In principle, a higher activity is essentially a higher rate constant specific to a given nickel. In order to move away from separately determining rate constant for each type of nickel, the activity term is defined to get around this issue.

Using such an equation, a nickel metal preparation is active if it has an activity of at least 4.0, or at least 6.0, or at least 7.0, or at least 8.0.

Nickel metal preparations are also active if they efficiently form zero-valent nickel phosphorus ligand complexes at a rate suitable for use in a manufacturing process involving a hydrocyanation catalyst. A suitable rate is a time for achieving equilibrium in the formation of a nickel metal phosphorus ligand complex of no more than 8 hours, no more than 6 hours, no more than 5 hours, no more than 4 hours, no more than 3 hours, no more than 2 hours, no more than 1 hour, or no more than 30 minutes. Nickel preparations that form complexes with phosphorus-containing ligands very slowly (e.g., by requiring several days or a week for formation) are not active nickel preparations useful for generating hydrocyanation catalysts.

Other Properties of Nickel Metal (Ni(0))

The nickel metal (Ni(0)) generated as described herein is a free-flowing powder that is highly reactive and pyrophoric upon exposure to oxygen (e.g., air).

The solubility of the nickel metal preparation is related to the ability of the nickel metal to form a complex with a phosphorus ligand. The average surface area, the porosity, and the distribution of surface areas of the nickel metal particles in the preparation are also related to the ability of a nickel preparation to form a complex with a phosphorus ligand.

BET surface area, or gas absorption, measurement techniques can be used to measure the surface area and porosity of the particles present in a sample. Molecules of an adsorbate gas are physically adsorbed onto the particle surfaces, including the surfaces of any pores or crystallites, under controlled conditions within a vacuum chamber. For example, BET Specific Surface Area (BET SSA) can be measured by observing nitrogen adsorption using the Tristar 3000 Nitrogen Adsorption Instrument after degassing the samples under vacuum overnight at 105° C. to 200° C. Multi-point BET measurements can be made using a partial pressure range of 0.05-0.3 P/Po. An adsorption isotherm can be obtained by measuring the pressure of the gas above the sample as a function of the volume of gas introduced into the chamber. The linear region of the adsorption isotherm can then be used to determine the volume of gas required to form a monolayer across the available particle surface area, using BET theory, as described by the following equation:

$$\frac{1}{v[(P/P_0)-1]} = \frac{c-1}{v_m}\left(\frac{P}{P_0}\right) + \frac{1}{v_m c}$$

where v is the volume of gas, P is the pressure, $P_0$ is the saturation pressure, $v_m$ is the volume of gas required to form a monolayer and c is the BET constant. Plotting relative pressure, $\varphi$ (=$P/P_0$), and volume allows the volume of a monolayer to be determined from the gradient and intercept of the line.

In general, a particulate nickel product with a higher BET SSA ($m^2$/gram) value is more active (forms a complex with a phosphorus-containing ligand) than a particulate nickel product with a lower BET SSA ($m^2$/gram) value. Particulate nickel products with BET SSA ($m^2$/gram) values of at least 2 $m^2$/gram, or of at least 4 $m^2$/gram, or of at least 5 $m^2$/gram, can be employed. Nickel produced at a given temperature in presence of added steam typically result in lower BET SSA ($m^2$/gram) and contains higher amount of unconverted nickel oxides (measured as insoluble nickel content that does not dissolve in ligand) when compared to nickel produced in absence of any added steam. The unconverted nickel oxide in final nickel product is a waste product which is a cost penalty. Hence, the methods described herein in absence of additional steam are particularly useful because these methods can efficiently and reproducibly generate particulate nickel products with specific surface area measured as BET-SSA of at least 8 $m^2$/gram, or of at least 9 $m^2$/gram, or of at least 10 $m^2$/gram, or of at least 10.1 $m^2$/gram, or of at least 10.2 $m^2$/gram, or of at least 10.3 $m^2$/gram, or of at least 10.4 $m^2$/gram, or of at least 10.5 $m^2$/gram. In contrast, methods of generating nickel powders, for example in the presence of steam, are less efficient, less reliable, and produce a product that typically has less activity due to lower have BET SSA ($m^2$/gram) values (e.g., less than 9 $m^2$/gram, or less than 8 $m^2$/gram).

The surface area of nickel particulate preparations can also be measured by a Laser Diffraction Specific Surface Area technique. Laser Diffraction Specific Surface Area (LD SSA) and particle size distribution (PSD) can be measured with a Mastersizer 2000 Particle Size Analyser (e.g., from Malvern Instruments Ltd using the Hydro 2000MU accessory and water as the dispersant). Light having a certain wavelength measured in micrometers is diffracted by the smaller size particles. The angle of diffraction will depend on the range of sizes present. The following equation can be used to report the Specific Surface Area (SSA):

$$SSA = \frac{6\sum \frac{V_i}{d_i}}{\rho \sum V_i} = \frac{6}{\rho D[3,2]}$$

where Vi is the relative volume in class i with a mean class diameter of $d_i$, $\rho$ is the density of the material, and D[3,2] is the surface area weighted mean diameter. This calculation can be carried out automatically within the laser diffraction system software. LD SSA provides a means of rapidly estimating the particle surface area. In carrying out this calculation, it is often assumed that the particles are substantially spherical, solid spheres.

The methods described herein convert almost all of the nickel(II) particles to a free-flowing particulate nickel metal product, with very little insoluble nickel waste generated. For example, the amounts of insoluble nickel metal in the particulate nickel metal product generated as described herein is typically less than 7%, or less than 6%, or less than 5%, or less than 4%, or less than 3.9%, or less than 3.8%, or less than 3.7%, or less than 3.6%, or less than 3.5%. Other methods such a those involving use of steam in a fluidized bed can be less efficient and/or less reliable, often generating nickel product that has at least 7%, or at least 8% insoluble nickel in the final product. Methods that reproducibly generate less waste are desirable because they are less costly, more efficient, and reduce the need for waste disposal.

As used herein, "free-flowing" as it relates to nickel metal preparations means that the preparation contains particles of nickel that are so small that the preparation is substantially a powder. For example, desirable nickel preparations include nickel particles with an average size that is no greater than about 150 nm, no greater than about 100 nm, no greater than 70 nm, or no greater than 50 nm. Although some agglomerates can form during the methods described herein, a nickel metal preparation can still be free-flowing so long as substantially all of the agglomerates are friable and readily break apart into small powdery particles. For example, a nickel metal preparation with agglomerates can become a free-flowing nickel metal preparation upon shaking or agitation of the preparation.

As used herein, "agglomeration" or "to agglomerate" means that particles adhere to one another. The cohesive forces between agglomerated particles can be such that particles cannot be readily separated from the agglomerates. In some instances, agglomerated particles are sintered together. Friable agglomerated particles are not sintered together and can crumble apart to form usable particles, for example, when the friable agglomerates are gently tumbled, or gently crushed.

The following Examples demonstrate the present invention and its capability for use. Several details and features are capable of modification in various apparent respects, without departing from the scope and spirit of the present invention. Accordingly, the Examples are to be regarded as illustrative in nature and non-limiting.

The Examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for.

EXAMPLES

Example 1: Calcination of Basic Nickel Carbonate

This Example illustrates use of air or nitrogen for calcination of basic nickel carbonate obtained from commercial source A.

Basic nickel carbonate is subjected to calcination in a batch rotary processor at 450° C. with gas flow rate of 3 L/min of pure gas (either air or nitrogen). When performing calcination in air (BK1), the basic nickel carbonate is subjected to calcination for 15 minutes after the concentration of carbon dioxide ($CO_2$) at the exit goes to zero.

When performing calcination in nitrogen (BK2), the basic nickel carbonate is subjected to calcination for two hours after the $CO_2$ concentration went to zero.

When employing nitrogen, the calcined basic nickel carbonate product has a distinct brown color, while the air calcined was black. The yellow to brown color of the nitrogen-calcined product does not change with exposure to air at room temperature.

In a second experiment, basic nickel carbonate was subjected to calcination in nitrogen using a rotary processor at 450° C. with nitrogen gas flow rate of 3 L/min until the concentration of carbon dioxide ($CO_2$) in the exit reached zero (BK3). The product color is brown. Air was then added to the rotary processor at 450° C. The product then changed in color from brown to black over time.

A third experiment, basic nickel carbonate was subjected to calcination in air using a rotary processor at 450° C. with nitrogen gas flow rate of 6 L/min for the following time periods after the concentration of carbon dioxide ($CO_2$) in the exit gases reached zero: for 15 minutes for one batch, and for 30 minutes for a second, separate batch. The product for both batches was NiO, which was black in color and free-flowing.

The properties of nickel oxide formed from basic nickel carbonate calcined under the indicated conditions are shown in Table 2.

TABLE 2

Properties of Nickel Oxide Generated from BNC under Various Conditions

| ID | Processing Conditions Cal. ° C. | Est. Cal. ° C. | Red ° C. | Residence Time Calcination (min) | BET SSA (m2/g) NiO | Ni | Activity | Inert Levels (% Ni) | Insoluble Ni (% Ni) | Weight Loss at 600° C. |
|---|---|---|---|---|---|---|---|---|---|---|
| T1 | 450 | 315 | 350 | 44 | 227 | 8.84 | 8.17 | 3.17 | 3.17 | 11.38% |
| T2 | 450 | 315 | 350 | 28 | 224 | 9.9 | 8.36 | 3.86 | 3.86 | 11.16% |
| T3 | 450 | 315 | 350 | 37 | 186 | 9.45 | 8.26 | 3.14 | 3.14 | 10.34% |
| T4 | 550 | 435 | 350 | 45 | 80 |  | 7.36 | 2.71 | 2.71 | 3.89% |
| T5 | 550 | 435 | 350 | 74 | 95 | 8.62 | 8.13 | 1.86 | 1.86 | 4.23% |
| T6 | 550 | 435 | 350 | 23 | 89 | 9.12 | 8.58 | 3.00 | 3.00 | 3.73% |
| T7 | 550 | 435 | 350 | 30 | 83 | 8.20 | 8.76 | 3.29 | 3.29 | 2.98% |

These experiments show that calcination of basic nickel carbonate in air at about 450° C. until carbon dioxide and water is no longer detected in the effluent is an economical and effective process for generating a NiO product that can be reduced to nickel metal.

The conversion of basic nickel carbonate to nickel oxide varies somewhat with the temperature of calcination. Table 3 shows the percent BNC converting to nickel oxide as detected by weight loss.

TABLE 3

Percent Conversion of BNC to NiO

| Calcination Temperature (° C.) | % Conversion of BNC |
|---|---|
| 300° C. | 91.6% |
| 400° C. | 94.6% |
| 450° C. | 96.9% |
| 500° C. | 98.5% |

As shown in Table 3, calcination temperatures above at least 400° C. generally improves conversion of BNC to nickel oxide.

Example 2: Reduction of NiO in Hydrogen with Steam

This Example describes experiments that further explore reduction of NiO by hydrogen within a rotary processor in the presence of steam. The NiO for these experiments is generated by calcination of basic nickel carbonate from commercial source A or commercial source B Contact between the two phases, i.e., solid and gas phase, is accomplished in a batch rotating bed. The system operated in a semi-batch mode where a set amount of raw material charged to the kiln was continuously exposed to a flowing reactant gases.

In a first experiment (BK4), nickel oxide (250 g) is generated by calcination of BNC from commercial source A. The nickel oxide is reduced in a rotary processor at 350° C. in an atmosphere of 10% hydrogen and 30% steam with the remainder as nitrogen. The steam is added gradually (about 0.25 L increments every 1-2 minutes). The flow rate of the gaseous atmosphere through the rotary processor is 3-6 L/minute. The rotational speed of the rotary processor is 1-2 rpm. As soon as the hydrogen was introduced, the color of the material in the rotary processor changes from black to yellow and then to brown within 1-2 minutes, usually beginning at the region first contacted by hydrogen. All of the material in the bed turns brown within 15-30 minutes, but as the reaction progresses, the material eventually turns black. Hydrogen consumption is roughly 50% of the inlet value.

Buildup is observed on the wall near the end of the reactor, but most of the reduced material is free-flowing. The product is generally pebbly, where the pebbles are about 0.25 inches in diameter, or smaller. Some pebbles are larger (about ⅜ to ½ inch in size). The pebbles are friable and fall apart with some shaking to form a loose powder. When a portion of the final product is removed and exposed to air, it ignites spontaneously in air (i.e. was pyrophoric), but only after some delay.

A series of experiments is similarly performed to evaluate the reduction of nickel oxide by hydrogen in the presence of steam. The nickel oxide is generated by calcination of basic nickel carbonate from commercial source A or commercial source B at 450° C. in air. During reduction of the nickel oxide, the steam concentration is varied between 10%-50% (v/v), while the hydrogen content is varied between 10%-70% v/v.

Table 4 shows the conditions correlated with agglomeration or the lack thereof.

TABLE 4

Properties of nickel metal Ni(0) generated from nickel oxide (NiO) by hydrogen in the presence of hydrogen and steam.*

| ID | Reduction Temperature | Gas Composition | Physical Properties |
|---|---|---|---|
| BK4 | 350° C. | 10% $H_2$ 30% Steam | Free-flowing powder with friable pebbles. |
| BK5 | 350° C. | 10% $H_2$ 50% Steam | Mostly free-flowing; two large friable chunks. |
| BK6 | 350° C. | 30% $H_2$ 30% Steam | Free-flowing powder with friable pebbles. |
| BK7 | 350° C. | 70% $H_2$ 30% Steam | Free-flowing powder with friable pebbles. |
| BK14 | 400° C. | 70% $H_2$ 30% Steam | Large agglomerates. |
| BK16 | 375° C. | 70% $H_2$ 30% Steam | Agglomerates; material sticking to the wall. |
| BK18 | 375° C. | 30% $H_2$ 30% Steam | Agglomerates. |

*Nitrogen was present as the remainder of the atmosphere.

The activities of several samples are evaluated using a reactor bottle equipped with a magnetic stir bar, into which reactants are charged while enclosed in glove box operating with a dry nitrogen atmosphere. To this bottle is added 80 gram of a 5% by weight Ligand A solution in a 3-pentenenitrile (3PN) solvent, 1.6 gram nickel metal powder, and 0.8 gram of anhydrous $ZnCl_2$. The reaction mixture within the reaction bottle is heated to 60° C. Filtered liquid samples from the reaction mixture are removed from the reactor bottle at intervals of 0.5-2 hours, with a final sample being taken after 24 hours. In those instances where no soluble nickel is detected, it is judged that the reaction produces less than about 20-50 ppm soluble nickel in the form of soluble nickel complexes of Ligand A.

The structure of Ligand A is shown below.

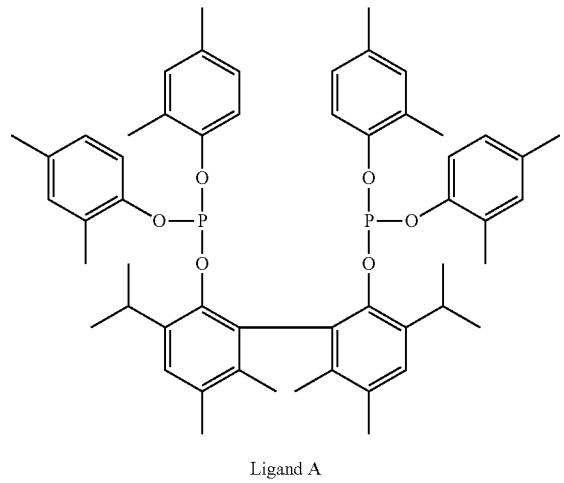

Ligand A

The activities of different nickel metal preparations reduced in an atmosphere of hydrogen, steam and nitrogen are provided in Table 5.

TABLE 5

Activities of nickel metal Ni(0) generated from nickel oxide (NiO) in the presence of hydrogen and steam.*

| | Reduction | Gas | Ni(0) Activity | | Insoluble Nickel Content (% of Ni) | |
|---|---|---|---|---|---|---|
| ID | Temperature | Composition | Sample 1 | Sample 2 | Sample 1 | Sample 2 |
| BK4 | 350° C. | 10% $H_2$ 30% Steam | 5.4 | 4.8 | 7.3% | 7.9% |
| BK5 | 350° C. | 10% $H_2$ 50% Steam | 1.6 | 2.2 | 7.5% | 8.5% |
| BK6 | 350° C. | 30% $H_2$ 30% Steam | 2.6 | 5.2 | 5.3% | 4.2% |
| BK7 | 350° C. | 70% $H_2$ 30% Steam | 2.7 | 6.9 | 6.3% | 4.2% |

*Nitrogen was present as the remainder of the atmosphere.

Hence, higher temperatures are correlated with agglomeration. In addition, the activity of nickel metal (Ni(0)) preparations reduced at 350° C. in the presence of steam ranged from about 1.6 to about 6.9.

Example 3: Reduction of Nickel in a Rotary Processor without Steam

This Example shows that nickel oxide (NiO) is more effectively reduced in a rotary processor in an atmosphere that does not use steam.

In a first experiment (BK8), nickel oxide obtained from commercial source A is reduced within a rotary processor at 350° C. in an atmosphere of 70% hydrogen and 30% nitrogen, without added steam or water. The material in the rotary reactor is initially free-flowing but then appeared to be slightly cohesive. The material builds up along the walls of the reactor until it rotates to the top of the reactor, at which time the material falls under its own weight. Eventually the material becomes less cohesive with time and starts rolling freely.

Reduction for this first experiment is complete within 1.25 hours. The final product is freely flowing, and although some pebbles are present, most are below 0.25 inches in size. Initially it appeared that the smaller pebbles (about 2-3 mm) are not friable, however after transferring the samples to an air-tight container the pebbles are not present. A sample of the Ni(0) metal so produced is very pyrophoric.

In a second experiment (BK9), nickel oxide from commercial source A is reduced within a rotary processor at 300° C. in an atmosphere of 70% hydrogen (v/v) and 30% nitrogen (v/v), without steam. Reduction is complete by about 2 hours. The nickel metal product is free-flowing and very powdery. Although some pebbles are present, they were friable. The nickel so produced is pyrophoric.

Example 4: Nickel Metal Produced with Added Sulfur

The Example illustrates that nickel metal (Ni(0)) is readily generated from nickel(II)-containing particles that contained sulfur.

In a first experiment (BK10), basic nickel carbonate (300 g) from commercial source B is mixed with 1 wt % sulfur on a final expected nickel basis, and subjected to calcination at 450° C. in air (flowing at 6 L/min) The reactor is cooled and the reaction chamber was purged of air using nitrogen. The calcined material is powdery and flowable.

The calcined material is then reduced at 350° C. in the rotary processor with an atmosphere of 70% $H_2/N_2$ as reductant (flowing at 6 L/min), and with a rotational speed of 1 rpm. During reduction the material initially turns a dirty yellow color but as the reaction progresses the powdery material begins to turn from grey to black. After reduction a few yellow flakes is visible. The nickel metal so produced is flowable.

In another experiment (BK11), NiO from commercial source C containing 1% sulfur is reduced at 350° C. in the rotary processor with an atmosphere of 70% $H_2$ and 30% $N_2$ as reductant (flowing at 6 L/min), and with a rotational speed of 1 rpm. The nickel metal product so produced is flowable and exhibits pyrophoricity.

The activities of these nickel products are shown in Table 6.

TABLE 6

Activities of Nickel Metal Generated from BNC with 1% Sulfur

| ID | Reduction Temperature | Gas Composition* | Ni(0) Activity Sample 1 | Ni(0) Activity Sample 2 | Insoluble Ni Sample 1 | Insoluble Ni Sample 2 |
|---|---|---|---|---|---|---|
| BK10 | 350° C. | 70% $H_2$ | 9.1 | — | 4.3% | — |
| BK11 | 350° C. | 70% $H_2$ | 12.3 | 12.9 | 3.2% | 3.8% |

As shown in Table 6, an active metal product is generated from a basic nickel carbonate staring material that contains about 1% sulfur (based on the nickel content).

Example 5: Nickel Metal Produced from Nickel Formate

In this experiment (BK13), nickel formate is subjected to calcination at 300° C. in nitrogen (flowing at 6 L/min) in a rotary processor with a rotational speed of 1 rpm. The product is black and very free-flowing. The nickel metal so produced exhibited an activity of 1.7 or 2.5 in two tests, and has about 3.9% inert material.

Example 6: Properties of Nickel Metal Generated Under Different Conditions

A comparison of the agglomeration/flowing properties of batches of nickel(II) particles reduced in the rotary processor with and without steam is shown in Table 7.

TABLE 7

Properties of nickel metal Ni(0) generated under Various Conditions.

| ID | Reduction Temperature | Gas Composition* | Physical Properties |
|---|---|---|---|
| BK4 | 350° C. | 10% $H_2$ 30% Steam | Commercial source A basic nickel carbonate calcined to produce NiO, which was reduced to generate a free-flowing powder with friable pebbles. |
| BK5 | 350° C. | 10% $H_2$ 50% Steam | Commercial source A basic nickel carbonate calcined to produce NiO, which was reduced to generate a mostly free-flowing product but with two large friable chunks. |
| BK6 | 350° C. | 30% $H_2$ 30% Steam | Commercial source A basic nickel carbonate calcined to produce NiO, which was reduced to generate a free-flowing powder with friable pebbles. |
| BK7 | 350° C. | 70% $H_2$ 30% Steam | Commercial source A basic nickel carbonate calcined to produce NiO, which was reduced to generate a free-flowing powder with friable pebbles. |
| BK8 | 350° C. | 70% $H_2$ | Commercial source A basic nickel carbonate calcined to produce NiO, which was reduced to generate a free-flowing powder; slight buildup that falls to loose powder. |
| BK9 | 300° C. | 70% $H_2$ | Commercial source A basic nickel carbonate calcined to produce NiO, which was reduced to generate a free-flowing powder. Takes longer for reduction compared to BK8. |
| BK10 | 375° C. | 70% $H_2$ 30% Steam | BNC from commercial source B + 1% sulfur (nickel basis) was calcined at 450 ° C., and the resulting NiO then reduced to yield agglomerates with material sticking to the wall. |
| BK11 | 350° C. | 70% $H_2$ | NiO from commercial source C + 1% sulfur was reduced to generate a flowable powder with friable pebbles. |
| BK12 | 400° C. | 70% $H_2$ | NiO from commercial source A was reduced to yield large agglomerates; shaking does not break apart the pebbles. |
| BK13 | 300° C. | $N_2$ only | Nickel formate was subjected to reduction in nitrogen (only) with about 68% weight loss, yielding a very free flowing product with some soft agglomerates that were easily broken. |
| BK14 | 400° C. | 70% $H_2$ 30% Steam | Large agglomerates. |
| BK15 | 375° C. | 70% $H_2$ | Bed agglomerates, |
| BK16 | 375° C. | 70% $H_2$ 30% Steam | Bed agglomerates; material sticking to the wall. |
| BK17 | 375° C. | 70% $H_2$ | Bed agglomerates; material sticking to the walls of the rotary processor but fell off at the end; agglomerates did not completely break apart on shaking. |
| BK18 | 375° C. | 30% $H_2$ 30% Steam | Bed agglomerates. |
| BK19 | 375° C. | 10% $H_2$ | Bed agglomerates that fell apart easily with shaking. |

*Nitrogen was present as the remainder of the atmosphere in the rotary processor.

In general, for the rotary apparatus employed under the conditions described above, less agglomeration is observed when reduction was performed at temperatures lower than 375° C. (e.g., about 300° C. to 350° C.). Introduction of steam does not reduce agglomeration in the rotary processor.

Greater than 95% percent nickel oxide is converted to nickel metal during the reduction processes described herein as detected by weight loss, and the inert level analysis described below.

A comparison of the activities of nickel metal produced with and without added team from the different BNC sources and under various conditions is provided in Table 8.

TABLE 8

Activities of nickel metal Ni(0) generated from nickel oxide (NiO) in the presence and absence of steam.

| | Reduction | Gas | Ni(0) Activity | | Insoluble Ni | |
|---|---|---|---|---|---|---|
| ID | Temperature | Composition* | Sample 1 | Sample 2 | Sample 1 | Sample 2 |
| BK4‡ | 350° C. | 10% $H_2$ 30% Steam | 5.4 | 4.8 | 7.3% | 7.9% |
| BK5 | 350° C. | 10% $H_2$ 50% Steam | 1.6 | 2.2 | 7.5% | 8.5% |
| BK6 | 350° C. | 30% $H_2$ 30% Steam | 2.6 | 5.2 | 5.3% | 4.2% |
| BK7 | 350° C. | 70% $H_2$ 30% Steam | 2.7 | 6.9 | 6.3% | 4.2% |
| BK8 | 350° C. | 70% $H_2$ | 11.4 | 11.7 | 3.7% | 5.4% |
| BK9 | 300° C. | 70% $H_2$ | 12.4 | 13.6 | 4.6% | 4.7% |
| BK12 | 400° C. | 70% $H_2$ | 10.7 | — | 3.7% | — |
| BK14 | 400° C. | 70% $H_2$ 30% Steam | 7.0 | — | 3.7% | — |
| BK15 | 375° C. | 70% $H_2$ | 11.3 | 10.3 | 3.5% | 3.3% |
| BK16 | 375° C. | 70% $H_2$ 30% Steam | 7.2 | 7.8 | 3.7% | 3.2% |
| BK17 | 375° C. | 30% $H_2$ | 7.6 | 9.9 | 4.2% | 3.0% |
| BK18 | 375° C. | 30% $H_2$ 30% Steam | 8.1 | 8.9 | 4.0% | 4.0% |
| BK19 | 375° C. | 10% $H_2$ | 10.2 | 10.4 | 3.1% | 2.9% |

*Nitrogen was present as the remainder of the atmosphere.
‡The flow rate of reduction gas was 3 or 6 sL/min for BK4; but it was 6 sL/min for all other samples.

As shown in Table 8, use of hydrogen as the reductant without steam addition but with reduction at about 300° C. to 350° C. can yield a nickel metal (Ni(0)) product with an activity ranging from about 11.4 to about 13.6, which was significantly higher than the activity observed for the nickel metal (Ni(0)) product generated by reduction at about 300° C. to 350° C. with hydrogen and added steam, which ranged from about 1.6 to about 6.9.

Higher proportions of hydrogen in the reductant gas can be employed during reduction when no steam is added, which means the reduction process proceeds faster. For example, reduction without steam proceeds within about 1-2 hours, but when steam is added the reduction process takes 4-5 hours.

In general, although reduction temperatures of about 375° C. or somewhat higher can provide an active product, the product tends to become more agglomerated than when temperatures at about 360° C. or lower were employed. Use of temperatures above 375° C. is generally correlated with more agglomeration, which can render the product unusable.

Use of hydrogen as the reductant without addition of steam is a more efficient, less wasteful process for reduction of nickel(II), and this process yields a nickel (Ni(0)) metal product with an activity that is about two to seven times more active than a nickel metal product generated by reduction in hydrogen with added steam.

The following Table 9 shows the effect of additional process steam during reduction on the BET surface area and unconverted nickel oxides within the final resulting nickel. The additional steam is in excess of what is being generated in the reduction process due to chemistry. One can observe a trend towards lower surface area and higher content of unconverted nickel oxides (measured as insoluble nickel content in organic ligand) with higher steam concentration. The lower surface area plays a role in the lowering of activity of the final metal in the dissolution process in organic ligand. Higher steam concentrations also leads to ineffective conversion of the nickel oxide to nickel which is indicated by insoluble nickel content which contains mostly unconverted nickel oxides. As such addition of steam is detrimental to the quality of our final nickel product and the existing process (rotary kiln) has a distinct advantage over fluidized bed for reducing nickel oxide to nickel as the former that does not need any additional steam to make a free flowing nickel product.

TABLE 9

Effect of steam on the measured surface area (BET) and insoluble nickel content

| Sample ID | Reduction Temperature (° C.) | Reduction gas composition (% v/v) | | | Activity | % Insoluble nickel | BET SSA ($m^2/g$) |
|---|---|---|---|---|---|---|---|
| | | $H_2$ | Steam | $N_2$ | | | |
| BK4 | 350 C. | 10 | 30 | 60 | 4.8 | 7.9% | 7.82 |
| BK5 | 350 C. | 10 | 50 | 40 | 2.2 | 8.5% | 7.59 |
| BK6 | 350 C. | 30 | 30 | 40 | 5.2 | 4.2% | 8.41 |
| BK7 | 350 C. | 70 | 30 | 0 | 6.9 | 4.2% | 7.29 |
| BK8 | 350 C. | 70 | 0 | 30 | 11.7 | 5.4% | 11.64 |
| BK9 | 300 C. | 70 | 0 | 30 | 13.6 | 4.7% | 10.44 |
| BK 12 | 400 C. | 70 | 0 | 30 | 10.7 | 3.7% | 10.72 |
| BK14 | 400 C. | 70 | 30 | 0 | 7.0 | 3.7% | 8.11 |
| BK15 | 375 C. | 70 | 0 | 30 | 11.3 | 3.5% | 12 |
| BK16 | 375 C. | 70 | 30 | 0 | 7.2 | 3.7% | 8.44 |
| BK17 | 375 C. | 30 | 0 | 70 | 9.9 | 4.2% | 12.2 |
| BK18 | 375 C. | 30 | 30 | 40 | 8.1 | 4.0% | 8.71 |
| BK19 | 375 C. | 10 | 0 | 90 | 10.2 | 3.1% | 11.05 |

As indicated in Table 9, a higher BET SSA ($m^2/g$) value is correlated with increased activity, and when steam is present the nickel metal product has a lower BET SSA ($m^2/g$) value and lower activity. For example, particulate nickel products are produced with BET SSA ($m^2/gram$) values of at least 10 $m^2/gram$ when no steam is present during reduction. However, when steam is added to the reduction process, the nickel product has BET SSA ($m^2/gram$) values of less than 9 $m^2/gram$.

Example 7: 6-Inch Fluidized Bed Operation
[Comparative]

About 8 lbs of basic nickel carbonate from commercial source A is charged to a 6-inch diameter fluidized bed reactor. The gas phase is dispersed in the bed of particles with an upward-flowing mode. The BNC is calcined in 100% air fluidized at 400° C. for about 1 hour. This is followed by reduction at 400° C. in the presence of a reducing gas containing 10% $H_2$ in $N_2$ for about 2 hours. The reduced nickel product is agglomerated.

Example 8: 6-Inch Fluidized Bed Operation with Steam Addition [Comparative]

About 8 lbs of BNC from commercial source A is charged to the 6-inch diameter fluidized bed reactor described in example 7. The BNC is calcined in 100% air fluidized at 400° C. for about 1 hour. This is followed by reduction at 400° C. in a reducing gas containing 10% $H_2$/10% steam/balance $N_2$ for about 2 hours. The reduced nickel product is not agglomerated and instead has a powdery and free-flowing consistency.

Example 9: 6-Inch Fluidized Bed Operation with Steam Addition [Comparative]

About 8 lbs of BNC from commercial source A is charged to the 6-inch diameter fluidized bed reactor described in example 7. The BNC is calcined in 20% steam in $N_2$ and at 400° C. Reduction is carried at 325° C. with a reducing gas containing 20% $H_2$/20% Steam/balance $N_2$. The final product is mostly free flowing but did have chunks/agglomerates. This example shows the effect of limiting hydrogen concentration during the reduction process compared to Example 8. Addition of steam does not eliminate the chucks and agglomerates.

Example 10: 7-Inch Diameter Rotary Unit Operation with No Steam Addition

Processing is performed in a continuous 7-inch diameter, horizontal rotary kiln processor having a variable-speed rotation motor and adjustable incline. The unit is equipped with a feed canister, lock hopper, variable-feed screw feeder and four-zone temperature control with individual zone thermocouples. The gas feeds are metered using mass flow controllers. The off-gas exited the rotary unit and passed through a hot cyclone for entrained solid fines separation from the gas stream. The cyclone-separated gas stream is cooled using a water-cooled heat exchanger and thermally destructed in an afterburner. An infra-red gas detector [IR Analyzer 208] measures the $CO_2$ content and a thermal conductivity detector (TCD) measures the $H_2$ content of the gas before the afterburner. Contact between the two phases, i.e., solid and gas phase, is accomplished in a counter-current flow mode, where the two phases travel in opposite directions (i.e., the gas phase enters the rotary unit near the exit for the solid phase).

Basic nickel carbonate from commercial source A is calcined in the continuous 7" diameter, horizontal rotary unit at 450° C. The feed rate of BNC was 7.5 kg/hr and air flow rate is 30 L/min. The off-gas is continuously monitored for the $CO_2$ produced in the process, which is present at the level expected from the given mass of BNC calcined per unit time. The calcination end product, nickel oxide, is evaluated for any subsequent weight loss in a muffle furnace to determine the degree of conversion. The conversion is maintained above 95% for the process.

The subsequent nickel oxide product is charged back to the 7" rotary kiln (in a separate campaign) and is reduced with 70% $H_2$/$N_2$ at rotational speed of 1.5-3 rpm and typical incline of 0.026 ft/ft. Hydrogen is fed counter-current to the nickel oxide feed. Under this configuration, a significant amount of nickel and nickel oxide buildup is observed in the reactor. During the run, product discharge is erratic and poor. At the end of the run about 40 lbs of nickel-nickel oxide is present inside the reactor. Build up on wall effectively lead to heat transfer issues. The volume occupied by the build up is approximately 30% of the kiln volume and is unmanageable. The process was terminated and the rotary kiln is cleaned out.

By placing adequate lifters which are about 0.25" in width and about 0.75" in height and welded as strips running parallel, but in slightly "cork-screw" fashion along the interior length of the kiln, the material in the kiln moves more efficiently. The "cork-screw" curve of the lifters is such that the horizontal position of each lifter at one end of the kiln is at approximately 15° from the horizontal position of that lifter at the other end of the kiln. Thus, the strip starts at the front end of kiln at a 6 o'clock position and ends at the back end at about a 5 o'clock position, with a slight curve over the approximate 6 ft length of kiln in the direction of the kiln rotation. The lifters provide a forward momentum to the powder.

The movement of the particles is significantly improved when a mechanical agitation to the kiln is provided which involved using a set of rapping mechanisms outside of the kiln on each side of the furnace. The rotation of the kiln caused the rappers to knock on the reactor vessel at regular frequency of about 10-12 seconds in sequence at front and back end of the kiln. The material in the kiln moves efficiently through the kiln and the amount in the kiln is reduced to approximately 3-5 lbs occupying about 5-10% of the reactor volume. Product discharge rate is steady and consistent. The off-gas $H_2$ concentration also becomes more uniform.

Example 11: 7-Inch Diameter Rotary Unit Operation with No Steam Addition

BNC from commercial source A is calcined in a continuous 7" rotary unit at 450° C. as described in Example 10.

The resulting nickel oxide is then reduced in the same continuous rotary unit in a subsequent reduction campaign. The reduction temperature is 310-340° C. The reducing gas composition is 60-70% $H_2$/$N_2$, typically at 70%. No additional steam is introduced in the process. Residence time of the particles is varied between 40-125 minutes, typically about 75 minutes. The solid feed rate is varied between 1.0-5 kg/hr, typically at 1.5 kg/hr. The hydrogen/NiO molar feed rate is maintained between values of 1-3, typically at 2.4. The gas residence time is varied between 1-5 minutes, typically at 1.4 minute. The rotary kiln rpm is varied between 0.5-5, the value of 3 rpm giving the adequate mixing of particles with gas. The gas flow is introduced counter-current to the particle flow. This counter-current configuration is usually preferred to keep the dust from being carried with the product but one can envision using co-current flow of both gas and particles to achieve the same end. The counter-current flow is also desired from the point of view of keeping highest concentration of hydrogen seeing the lowest concentration of nickel oxide at its entrance. This minimizes a need for high temperatures and reduces the likelihood of hot spots due to the exothermic reduction of nickel oxide with hydrogen.

The off-gas is monitored for the hydrogen concentrations and is found to give hydrogen levels within expected level (~43%) based on the mass feed rate of oxide. Greater than 95% conversion of nickel oxide to reduced nickel is achieved. Steady product discharge rate is accomplished. The final product is active with an average activity of 11 and has low inert levels of about 4% or less.

Example 12: 7-Inch Diameter Rotary Unit Operation with No Steam Addition

Calcination of BNC from commercial source A is performed using the same conditions and rotary unit as described in Example 10. The reduction is performed with 40% $H_2$/$N_2$. The hydrogen to NiO feed ratio is 1.4, which is about 40% in excess of stoichiometric requirements. However, the amount of hydrogen in the off-gas does not reach the expected value indicating not all the nickel oxide is being converted. The product that comes out of the reactor is not pyrophoric. When the activity of the final product is measured, it is only about 3 and the conversion of NiO to Ni(0) is only about 57%, indicating incomplete reduction of the final product. The hydrogen concentration in the off-gas is ~20% instead of the expected ~11%. This indicates that even though the amount of hydrogen in the feed gas relative to nickel oxide is 40% more than the theoretical stoichiometric amount required, a percentage of the gas apparently bypasses the material in the system without contacting the solids and effectively leads to incomplete conversion of nickel oxide.

This example is carried out for a set residence time. The set residence time can be increased to accommodate the lower concentrations of hydrogen in the feed, and increase the conversion of NiO to Ni(0). Alternatively, a higher percentage of hydrogen can be used to reduce the processing time and improve the percent conversion of nickel oxide to nickel.

Example 13: 7-Inch Diameter Rotary Unit Operation with No Steam Addition

Calcination and reduction of BNC from commercial source A are carried at the same conditions and rotary unit as described in Example 10. The reduction is carried out with 60% $H_2/N_2$ leading to $H_2/NiO$ feed ratio of 2.1. The off-gas composition of $H_2$ is within the expected range of 33-34%. The final product is active and with low inert levels.

Example 14: 7-Inch Diameter Rotary Unit Operation with No Steam Addition

Calcination of BNC from commercial source A is carried at the same conditions as shown in Example 10. The reduction is carried out at average temperatures of 325° C. with 70% $H_2/N_2$. The feed rate of nickel oxide is increased from 1.5 kg/hr to 2 kg/hr thereby decreasing the feed material residence time from 75 minutes to 56 minutes. The molar feed ratio of $H_2/NiO$ is 1.82. The $H_2$ concentrations in the off-gas are close to the levels expected for good reduction, which is approximately 33-34%. The activities of the final nickel products are very good but the nickel oxide conversion to nickel is about 90-95%. The higher feed rate of nickel oxide indicates the residence time of 56 minutes is not sufficient to convert higher percentages of nickel oxide to nickel.

Table 10 summarizes how the ratio of hydrogen to nickel oxide correlates with the activity of the nickel product from reduction of nickel oxide in a rotary kiln. These data indicate that reduction of nickel oxide is efficiently performed at $H_2/NiO$ molar ratios that are above 1.4 for residence times of about 56-75 minutes.

TABLE 10

$H_2/NiO$ ratio for reduction in a rotary kiln

| Run No. | Gas composition | $H_2/NiO$ molar ratio | Ni activity | Insoluble Ni |
|---|---|---|---|---|
| 1 | 40% $H_2/N_2$ | 1.4 | 3.4 | 43% |
| 2 | 60% $H_2/N_2$ | 2.1 | 11-13 | <5% |
| 3 | 70% $H_2/N_2$ | 2.4 | 11-13 | <5% |
| 4 | 70% $H_2/N_2$ | 1.8* | 7-10 | 8-25% |

*Higher feed rate of NiO keeping $H_2$ feed rate constant.

Example 15: 7-Inch Diameter Rotary Unit Operation with No Steam

Calcination of BNC from commercial source A is carried at the same conditions as described in Example 1. Reduction is performed at temperatures of 350-375° C., which is higher than used in some of the previous experiments. The feed rate of nickel oxide is 1.5 kg/hr and the $H_2/NiO$ molar ratio is 2.4. The residence time of the material is 75 minutes. Small chunks of material are formed during the reduction process that could be heard dropping inside the product collection canister. The temperature is maintained for approximately 6-8 hours and the chunks or agglomerate formation continued to be observed although they are not consistently produced. These chunks are about 2-5% of the total bed as assessed by eye.

Lowering the temperatures back to 300-350° C. results in disappearance of these lumps. The product recovery is stable and good. The final product exhibits very good activity and low inert levels. As such the quality of the final product is not affected due to higher temperatures.

Example 16: Commercial Production of Reduced Nickel in a 2-Ft Diameter Rotary Unit with No Steam Addition This Example illustrates scaled-up production of reduced nickel using basic nickel carbonate obtained from commercial sources. Production is performed in two steps; i) calcination of basic nickel carbonate in the presence of air or nitrogen, and ii) reduction of the calcined nickel II product from i) to generate reduced nickel (Ni(0)) particles.

An industrial-scale horizontal particle processor (or kiln) is used that can provide low rpm rotation with a slightly inclined horizontal axis. The 2-ft internal diameter (ID.)× 10-ft long rotary kiln with an heated zone of about 8 ft is equipped with a feed hopper, a mechanical or pneumatic feeder such as a screw conveyor, gas feed ports (for air, $N_2$, reducing gas such as hydrogen), temperature and pressure indicators, an air-tight product discharge section, a conveyor system to remove the product, and an off-gas port to remove the spent gases. The unit can also be equipped with auxiliary systems for heating, cooling, introduction of nitrogen (as an inert gas) with control/safety interlocks during batch or continuous operation. The system is provided with a cyclone separator to remove the carry-over particles and an after-scrubber for off-gas treatment. The kiln can be electrically or gas fired.

Calcination Step: The feedstock, basic nickel carbonate, is fed to the feed hopper and conveyed into the rotary kiln at 300-400 lbs/hr rate. The solids inventory in the kiln is such that the nickel feed reaches no more than $¼^{th}$ of the diameter measured vertically when the barrel is leveled. The particles' residence time is maintained in the 30-60 minutes range. The kiln is maintained at 400-500° C. internal temperature using external heat and by feeding 12-25 $ft^3$/min of gas flow (either air or nitrogen) for temperature uniformity. As the particles tumble down the rotary kiln barrel, it is subjected to the calcination conditions. The off-gas is continuously monitored for carbon dioxide [$CO_2$]. The flowing particles are completely calcined when the off-gas $CO_2$ concentration drops to zero and stays there. The calcined particles are collected at the exit of the rotary kiln and properly stored at normal dry storage conditions.

Reduction Step: The calcined material (nickel oxide) generated in the calcination step is fed into the rotary unit using an feed auger system, or with a hopper and star valve feeder, or any suitable continuous feed mechanism. The nickel oxide feed could run co-current or counter-current to the gas flow. The example below employs counter-current flow of material.

The particles residence time is maintained in the 60-120 minutes range. The kiln is maintained at 300-350° C. internal temperature using external heat and by feeding 15-25 $ft^3$/min of gas flow, a mixture of 60-70% (v/v) hydrogen/nitrogen. There is no addition of water or steam to the kiln. Reduction is performed by the reducing gas as the material tumbles down the barrel and is internally dispersed in the continuous gas-phase. At the end of the reduction step, the free-flowing, powdery reduced nickel is removed from the kiln under nitrogen atmosphere.

The reduced nickel is transferred to an air-tight container for proper storage. A sample of the reduced Ni(0) metal so produced is very pyrophoric and shows high reactivity in lab testing.

REFERENCES

U.S. Pat. No. 3,793,005 discloses a process for reducing oxides and compounds heat decomposable to oxides of nickel and cobalt. A refractory lined hearth to form a shallow bed of pellets in a static state was used in the '005 patent process. The bed was heated to a temperature between about 750° C. and 1,100° C. by radiation and convection. The '005 patent also discloses incorporation of a reducing reagent within briquettes of nickel oxide.

U.S. Pat. No. 3,656,934 relates to the reduction of nickel-containing lateritic ores in a rotary kiln at high production rates to achieve selective reduction of nickel contained in the ore wherein the ore is preheated to at least about 1,000° F. (538° C.).

Rhamdhani et. al., Proceedings of EMC, pp 899-913 (2009), discloses phenomena affecting the final-product during the reduction of basic nickel carbonate (BNC) and NiO as the following: (1) chemical changes, i.e., decomposition, reduction and oxidation reactions; (2) NiO and Ni recrystallization and grain growth; (3) NiO and Ni sintering and densification; and (4) agglomeration of the NiO and Ni particles. Some of the disadvantages of the BNC and NiO reduction process described in Rhamdhani et. al., are; (i) saw dust is added to provide sufficient porosity in the bed during the reduction process, (ii) the reduction is carried out at an average temperature of 900° C. under an atmosphere containing cracked ammonia, 75% $H_2$ and 25% $N_2$; and (iii) the reduction product is crushed, blended with stearic acid and the pressed compacts undergo another sintering operation to produce >99% Ni.

U.S. Pat. No. 2,000,171 describes a multiple hearth type reactor where reduction of nickel ores was carried out by heating the material in a reducing environment using water gas mixture at 400-550° C. The patent discloses that the difficulty with reducing the nickel ore is the formation of cake of sintered material which was alleviated by adding the reducing gases at high temperatures of 500-700° C.

The following statements summarize aspects of the invention.

SUMMARY STATEMENTS

1. A method comprising: reducing nickel(II)-containing particles within a reaction vessel comprising an atmosphere comprising a reductant while rotating the nickel(II)-containing particles for a time and at a temperature sufficient to generate free-flowing particulate nickel metal (Ni(0)) product from the nickel(II)-containing particles.

2. The method of statement 1, wherein the nickel(II)-containing particles do not collide with sufficient force to agglomerate during reduction.

3. The method of statement 1 or 2, wherein the nickel (II)-containing particles are not compressed with sufficient force to agglomerate during reduction.

4. The method of any of statements 1-3, wherein rotating comprises rolling, stirring, falling, mixing, vibrating, or a combination thereof.

5. The method of any of statements 1-4, further comprising knocking the reaction vessel in at least one location, or in at least two locations, or in at least three locations, or in at least five locations, or in at least six locations, or in at least seven locations.

6. The method of any of statements 1-5, wherein the temperature is 200° C. to 800° C., or 275° C. to 360° C., or 275° C. to 360° C., or 300° C. to 350° C.

7. The method of any of statements 1-6, wherein the atmosphere contains hydrogen ($H_2$) as reductant, and optionally a carrier gas as the remainder of the atmosphere.

8. The method of any of statements 1-7, wherein the atmosphere contains 1-100% hydrogen ($H_2$) by volume, or 50-75% hydrogen ($H_2$) by volume, or 55-80% hydrogen ($H_2$) by volume, or 70% hydrogen ($H_2$) by volume.

9. The method of any of statements 1-8, wherein the $H_2$/Ni molar ratio during the reducing is between about 1.0 and 2.5, or between about 1.9 to about 2.5, or between about 2.0 to about 2.4.

10. The method of any of statements 1-9, wherein the $H_2$/Ni molar ratios during the reducing is greater than 2.

11. The method of any of statements 1-10, wherein the atmosphere has no added water or steam.

12. The method of any of statements 1-11, wherein the reaction vessel is a rotary kiln processor.

13. The method of any of statements 1-12, wherein the nickel(II)-containing particles are substantially free of water (e.g., the nickel(II)-containing particles contain less than 2% (w/w) water, or less than 1% (w/w) water, or less than 0.8% (w/w) water, or less than 0.6% (w/w) water, or less than 0.5% (w/w) water, or less than 0.3% (w/w) water, or less than 0.1% (w/w) water) prior to reduction.

14. The method of any of statements 1-13, wherein the time sufficient to generate free-flowing particulate nickel metal (Ni(0)) product from the nickel(II)-containing particles is about 0.5 hours to about 3 hours, or about 0.75 hours to 2.5 hours, or about 1 to 2 hours.

15. The method of any of statements 1-14 wherein the nickel(II)-containing particles comprise basic nickel carbonate, nickel oxide, nickel carbonate, nickel bicarbonate, nickel oxalate, nickel formate, nickel squarate, nickel hydroxide, nickel nitrate, nickel cyanate, nickel sulfate and combinations thereof.

16. The method of any of statements 1-15, wherein the nickel(II)-containing particles are first nickel(II)-containing particles that are subjected to calcination to generate second nickel(II)-containing particles.

17. The method of any of statements 1-16, wherein the second nickel(II)-containing particles are nickel oxide, nickel oxalate, nickel formate, nickel squarate, nickel hydroxide, nickel sulfate, or any combination thereof).

18. The method of statement 16 or 17, wherein calcination comprises heating the first nickel(II)-containing particles for a time sufficient to remove volatile components from the first nickel(II)-containing particles.

19. The method of any of statements 16-18, wherein calcination comprises heating the first nickel(II)-containing particles in an atmosphere comprising oxidizing constituents at a temperature of 350° C. to 600° C. for a time sufficient to remove volatile components from the first nickel(II)-containing particles.

20. The method of statement 18 or 19, wherein the time sufficient to remove volatile components from the first nickel(II)-containing particles comprises about 10 minutes to six hours.

21. The method of any of statements 16-20, wherein the first nickel(II)-containing composition is prepared by contacting nickel(II) ions dissolved in water with carbonate ions, bicarbonate ions, or a combination of carbonate ions and bicarbonate ions.

22. The method of any of statements 1-21, wherein the nickel(II)-containing particles are substantially free of aluminum, calcium, cobalt, iron, silicon, sodium, and zinc.

23. The method of any of statements 1-22, further comprising forming a complex between the nickel metal (Ni(0)) and a bidentate phosphorus-containing ligand of Formula I:

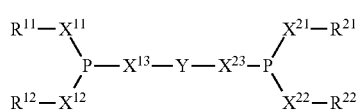

Formula I wherein, $X^{11}$, $X^{12}$, $X^{13}$, $X^{21}$, $X^{22}$, and $X^{23}$ independently represent oxygen or a single bond;

$R^{11}$, and $R^{12}$ independently represent identical or different, single or bridged organic radicals;

$R^{21}$, and $R^{22}$ independently represent identical or different, single or bridged organic radicals; and Y represents a bridging group.

24. The method of any of statements 1-23, wherein the free-flowing particulate nickel metal (Ni(0)) product is about two to seven times more active for formation of a catalyst with a phosphorus-containing ligand, than is a nickel metal product generated by reduction in a gaseous mixture comprising hydrogen with added steam.

25. The method of statement 23 or 24, wherein the phosphorus-containing ligand has the following structure:

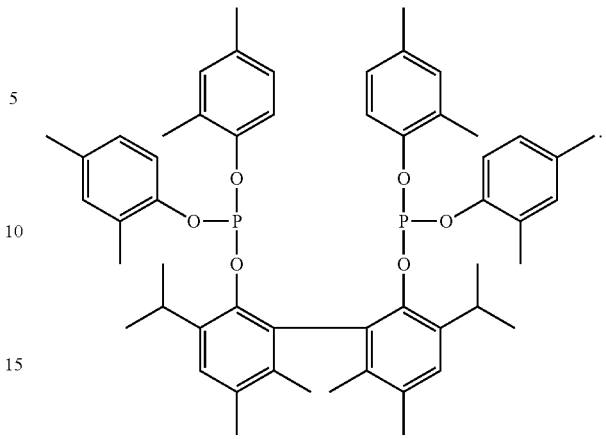

26. The method of any of statements 1-25, wherein 1-20 batches of the second nickel(II)-containing particles are processed to produce free-flowing particulate nickel metal (Ni(0)) product.

27. A method comprising:

(a) calcining first nickel(II)-containing particles in an atmosphere comprising oxidizing constituents at a temperature of 350° C. to 600° C. to generate second nickel(II)-containing particles; and (b) reducing the second nickel(II)-containing particles in a reducing atmosphere while rotating or turning the second nickel(II)-containing particles for a time and at a temperature sufficient to generate a particulate nickel metal (Ni(0)) product from the second nickel(II)-containing particles.

28. The method of statement 27, wherein the nickel(II)-containing particles do not collide with sufficient force to agglomerate during reduction.

29. The method of statement 27 or 28, wherein the nickel(II)-containing particles are not compressed with sufficient force to agglomerate during reduction.

30. The method of any of statements 27-29, wherein rotating comprises rolling, stirring, falling, mixing, vibrating, or a combination thereof.

31. The method of any of statements 27-30, further comprising knocking the reaction vessel in at least one location, or in at least two locations, or in at least three locations, or in at least five locations, or in at least six locations, or in at least seven locations.

32. The method of any of statements 27-32, wherein the atmosphere comprising oxidizing constituents is oxygen, ozone, air, or a mixture of nitrogen and oxygen.

33. The method of any of statements 27-32, wherein calcining comprises heating the first nickel(II)-containing particles for a time sufficient to remove volatile components from the first nickel(II)-containing particles.

34. The method of statement 33, wherein the time sufficient to remove volatile components from the first nickel(II)-containing particles comprises about 10 minutes to six hours.

35. The method of any of statements 27-34, wherein the reducing atmosphere contains hydrogen ($H_2$) as reductant, and optionally a carrier gas as the remainder of the atmosphere.

36. The method of any of statements 27-35, wherein the reducing atmosphere contains 1-100% hydrogen ($H_2$) by volume, or 50-75% hydrogen ($H_2$) by volume, or 55-80% hydrogen ($H_2$) by volume, or 70% hydrogen ($H_2$) by volume.

37. The method of any of statements 27-36, wherein the reducing atmosphere has no added water or steam.

38. The method of any of statements 27-37, wherein the reaction vessel is a rotary kiln processor.

39. The method of any of statements 27-38, wherein the second nickel(II)-containing particles are substantially free of water (e.g., the nickel(II)-containing particles contain less than 2% (w/w) water, or less than 1% (w/w) water, or less than 0.8% (w/w) water, or less than 0.6% (w/w) water, or less than 0.5% (w/w) water, or less than 0.3% (w/w) water, or less than 0.1% (w/w) water) prior to reduction.

40. The method of any of statements 27-39, wherein the temperature sufficient to generate free-flowing nickel metal (Ni(0)) is 200° C. to 800° C., or 275° C. to 360° C., or 275° C. to 360° C., or 300° C. to 350° C.

41. The method of any of statements 27-40, wherein the time sufficient to generate free-flowing particulate nickel metal (Ni(0)) product from the nickel(II)-containing particles is about 0.5 hours to about 3 hours, or about 0.75 hours to 2.5 hours, or about 1 to 2 hours.

42. The method of any of statements 27-41, wherein the second nickel(II)-containing particles comprise nickel oxide, nickel oxalate, nickel formate, nickel squarate, nickel hydroxide, nickel sulfate, or any combination thereof.

43. The method of any of statements 27-42, wherein the second nickel(II)-containing particles are nickel oxide particles.

44. The method of any of statements 27-43, wherein the first nickel(II)-containing particles and the second nickel (II)-containing particles are substantially free of aluminum, calcium, cobalt, iron, silicon, sodium, and zinc.

45. The method of any of statements 27-44, further comprising forming a complex between the at least a portion of the free-flowing particulate nickel metal (Ni(0)) product and a bidentate phosphorus-containing ligand of Formula I:

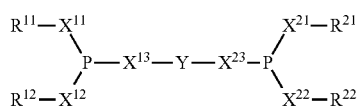

Formula I wherein, $X^{11}$, $X^{12}$, $X^{13}$, $X^{21}$, $X^{22}$, and $X^{23}$ independently represent oxygen or a single bond;

$R^{11}$ and $R^{12}$ independently represent identical or different, single or bridged organic radicals;

$R^{21}$ and $R^{22}$ independently represent identical or different, single or bridged organic radicals; and Y represents a bridging group.

46. The method of any of statements 1-45, wherein the free-flowing particulate nickel metal (Ni(0)) product is two to seven times more active for formation of a catalyst with a phosphorus-containing ligand, than is a nickel metal product generated by reduction in hydrogen with steam.

47. The method of statement 45 or 46, wherein the phosphorus-containing ligand has the following structure:

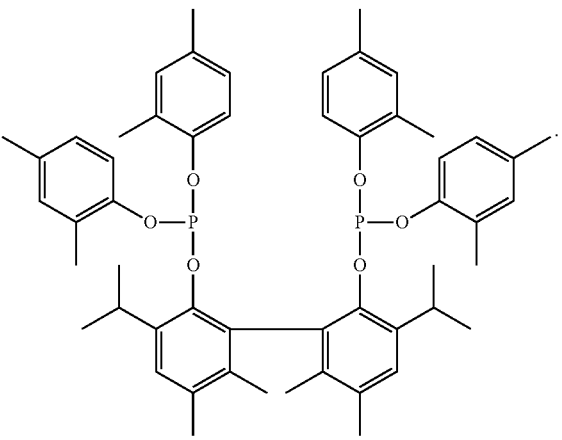

48. The method of any of statements 1-47, wherein the particulate nickel product has a BET SSA (m²/gram) value of at least 7 m²/gram, or of at least 7.5 m²/gram, or of at least 8 m²/gram, or of at least 9 m²/gram, or of at least 9.5 m²/gram, or of at least 10.2 m²/gram, or of at least 10.2 m²/gram, or at least 10 m²/gram, or of at least 10.1 m²/gram, or of at least 10.2 m²/gram, or of at least 10.3 m²/gram, or of at least 10.4 m²/gram, or of at least 10.5 m²/gram.

Although the foregoing detailed description contains many specifies for the purpose of illustration, a person of ordinary skill in the art will appreciate that many variations and alterations to the following details are within the scope of the invention.

Aspects of the present disclosure employ, unless otherwise indicated, techniques of chemistry, and the like, which are within the skill of the art. Such techniques are explained fully in the literature. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

Unless indicated otherwise: parts are parts by weight, concentration in % is % by volume (or sometimes by weight percent, "wt %"), temperature is in ° C., and pressure is in atmospheres. Pressures reported in pounds per square inch gauge (psig) include the pressure of one atmosphere (14.7 pounds per square inch). One atmosphere is equivalent to 14.7 pounds per square inch absolute or 0 pounds per square inch gauge. Standard temperature and pressure are defined as 25° C. and 1 atmosphere.

The following claims describe aspects of the invention.

What is claimed is:

1. A method comprising:
   (a) calcining first nickel(II)-containing particles in an atmosphere comprising oxidizing constituents to generate second nickel(II)-containing particles; and
   (b) reducing the second nickel(II)-containing particles in a reducing atmosphere while rotating or turning the second nickel(II)-containing particles in a rotary processor at 275° C. to 360° C. for a time sufficient to generate a free-flowing particulate nickel metal (Ni(0)) product from the second nickel(II)-containing particles, wherein the reducing atmosphere is free of added water or steam not produced by the reducing, and wherein a $H_2$/Ni molar ratio is employed during the reducing step of between about 1.9 and 2.5;

wherein the free-flowing particulate nickel metal (Ni(0)) product is two to seven times more active for complexation with a monodentate phosphorus-containing ligand, a bidentate phosphorus-containing ligand, or a combination thereof, than is a nickel metal product generated by hydrogen reduction with added water or steam that is not generated by the hydrogen reduction.

2. The method of claim 1, wherein calcining comprises heating the first nickel(II)-containing particles in an atmosphere comprising oxidizing constituents at a temperature of 350° C. to 600° C. for a time sufficient to remove volatile components from the first nickel(II)-containing particles.

3. The method of claim 2, wherein the time sufficient to remove volatile components from the first nickel(II)-containing particles comprises about 10 minutes to six hours.

4. The method of claim 1, wherein a $H_2$/Ni molar ratio is employed during the reducing step of between about 2.0 to about 2.4.

5. The method of claim 1, wherein a $H_2$/Ni molar ratio is employed during the reducing step that is greater than 2.

6. The method of claim 1, wherein the time sufficient to generate free-flowing particulate nickel metal (Ni(0)) product during the reducing step is 0.5 hour to 1.5 hour.

7. The method of claim 1, wherein the particulate nickel product has a BET SSA ($m^2$/gram) value of at least 8 $m^2$/gram.

8. The method of claim 1, wherein the free-flowing particulate nickel metal (Ni(0)) product is two to seven times more active for complexation with Ligand (A) to generate a catalyst for hydrocyanation of unsaturated nitriles to dinitriles, than is a nickel metal product generated by hydrogen reduction with added water or steam that is not generated by the hydrogen reduction, wherein Ligand (A) has the following structure:

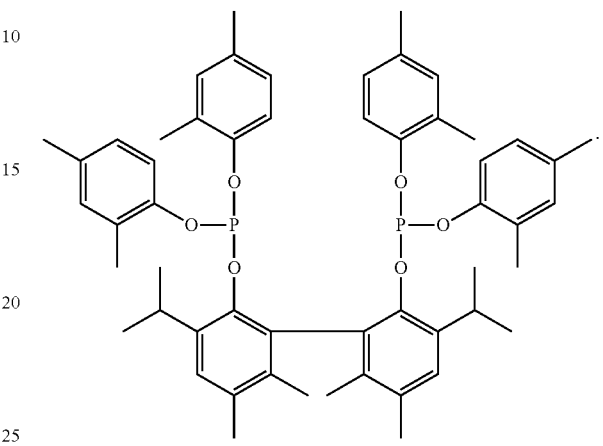

* * * * *